US008195495B2

(12) United States Patent
Fendelman et al.

(10) Patent No.: US 8,195,495 B2
(45) Date of Patent: Jun. 5, 2012

(54) COMPUTER SYSTEM AND METHOD FOR HANDLING ENCOUNTERS

(75) Inventors: Adam Fendelman, Chicago, IL (US); Josh Metnick, Chicago, IL (US); Brad Spirrison, Chicago, IL (US); Kevin Sours, Gardena, CA (US); Tien Yuan, Los Angeles, CA (US); Thomas Johnson, Menlo Park, CA (US); Chris Kuehn, Champaign, IL (US); Aaron Tubbs, Norwalk, CT (US)

(73) Assignee: Networking Research Group, Inc., Denver, CO (US)

( * ) Notice: Subject to any disclaimer, the term of this patent is extended or adjusted under 35 U.S.C. 154(b) by 1140 days.

(21) Appl. No.: 11/219,336

(22) Filed: Sep. 1, 2005

(65) Prior Publication Data

US 2008/0140487 A1     Jun. 12, 2008

Related U.S. Application Data

(60) Provisional application No. 60/607,066, filed on Sep. 1, 2004.

(51) Int. Cl.
*G06Q 10/00* (2006.01)
(52) U.S. Cl. ..................................... 705/7.12
(58) Field of Classification Search .................. 705/9, 1, 705/7.12
See application file for complete search history.

(56) References Cited

U.S. PATENT DOCUMENTS

| | | | | |
|---|---|---|---|---|
| 5,920,845 | A * | 7/1999 | Risemberg ..................... | 705/1 |
| 6,058,367 | A | 5/2000 | Sutcliffe et al. ................. | 705/1 |
| 6,249,282 | B1 * | 6/2001 | Sutcliffe et al. ................ | 715/751 |
| 6,272,467 | B1 * | 8/2001 | Durand et al. .................. | 705/5 |
| 6,594,502 | B1 | 7/2003 | Koester ....................... | 455/414.1 |
| 6,931,393 | B1 | 8/2005 | Schreiber ........................ | 707/3 |
| 6,934,739 | B2 * | 8/2005 | Pietila .......................... | 709/207 |
| 7,203,674 | B2 * | 4/2007 | Cohen ............................ | 707/3 |
| 7,277,888 | B2 * | 10/2007 | Gelormine et al. .............. | 707/6 |
| 7,305,398 | B2 * | 12/2007 | Teicher ........................ | 707/100 |
| 2002/0035493 | A1 * | 3/2002 | Mozayeny et al. .............. | 705/5 |
| 2004/0225551 | A1 * | 11/2004 | Hole .............................. | 705/9 |
| 2004/0249811 | A1 * | 12/2004 | Shostack et al. ................. | 707/5 |
| 2004/0260781 | A1 * | 12/2004 | Shostack et al. ............. | 709/207 |
| 2005/0038876 | A1 * | 2/2005 | Chaudhuri .................... | 709/219 |
| 2005/0131716 | A1 * | 6/2005 | Hanan et al. .................... | 705/1 |
| 2005/0246221 | A1 * | 11/2005 | Geritz et al. .................... | 705/10 |
| 2006/0015487 | A1 * | 1/2006 | Vest ................................ | 707/3 |
| 2006/0031258 | A1 * | 2/2006 | Seed .......................... | 707/104.1 |

OTHER PUBLICATIONS

"8 Minute Dating" available at www.8minutedating.com, accessed via the WayBack Machine at www.archive.org on Jul. 23, 2003.*
"Cupid.com/PreDating" available at www.pre-dating.com, accessed via the WayBack Machine at www.archive.org on Aug. 4, 2003.*

(Continued)

*Primary Examiner* — Neil Kardos
(74) *Attorney, Agent, or Firm* — Peter K. Trzyna, Esq.

(57) ABSTRACT

A method of computing to produce a schedule of meetings, the method including: entering into a computer parameters defining an event of meetings of members; entering into the computer a data set for each of the members, the set including: at least one classification characterizing the member, at least one classification for meeting other of the members, and if more than one classification for meeting is entered, a corresponding ranking of the classifications for meeting the other members; and generating a schedule of the meetings for the members by using the classifications and the rankings, if any.

84 Claims, 32 Drawing Sheets

OTHER PUBLICATIONS

Figure 1:
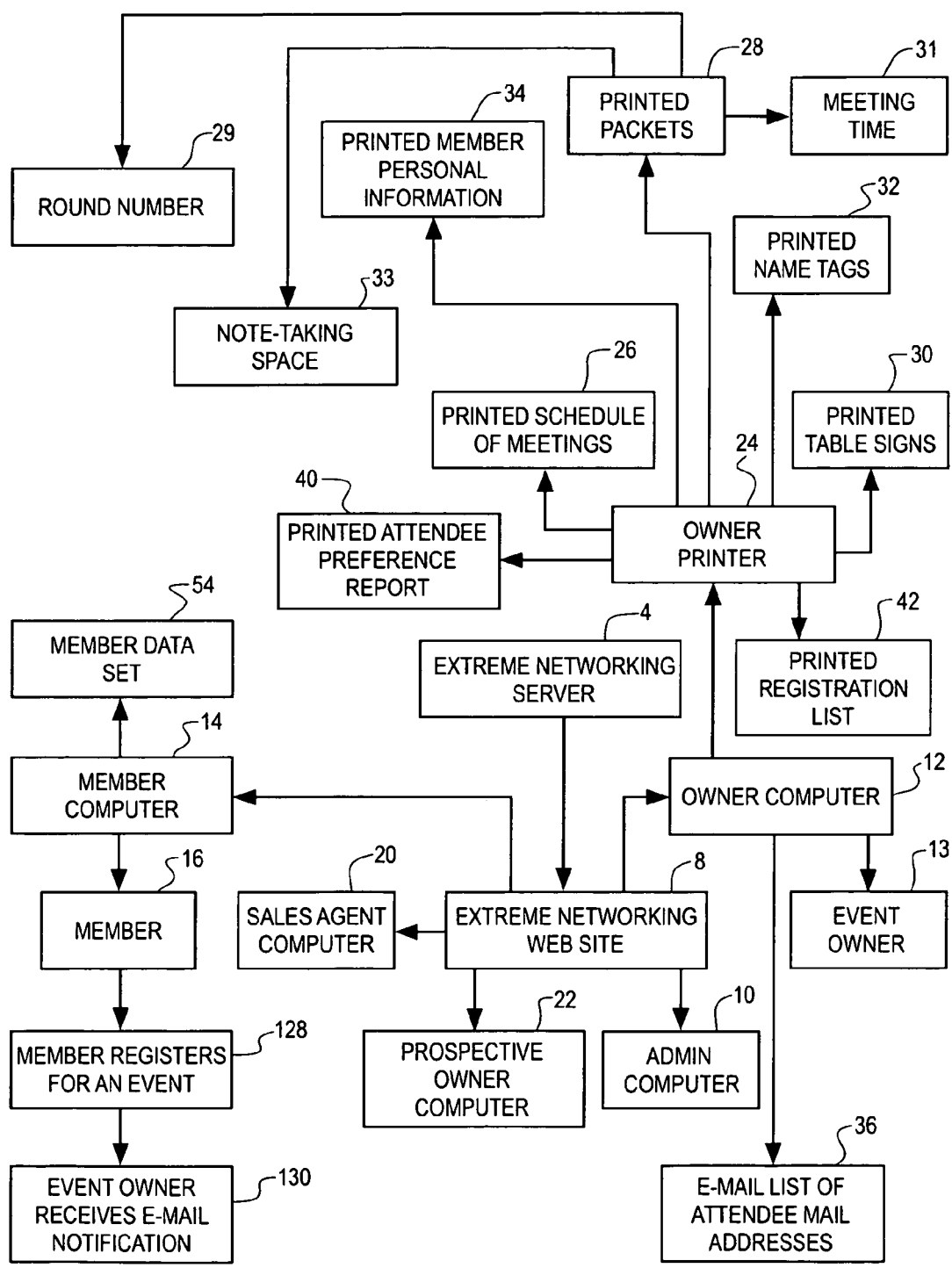

"Networking for Professionals" available at www.networkingforprofessionals.com, accessed via the WayBack machine at www.archive.org on Aug. 8, 2003.*

International Search Report for PCT/US06/34075, mailed Aug. 29, 2008. pp. 1-3.

Written Opinion of the International Searching Authority for PCT/US06/34075, mailed Aug. 29, 2008. pp. 1-9.

8 Minute Dating. http://www.8minutedating.com Jul. 23, 2003. pp. 1-4.

Cupid.com/PreDating. http://www.pre-dating.com Aug. 4, 2003. pp. 1-2.

Networking for Professionals. http://networkingforprofessionals.com Aug. 8, 2003. pp. 1-2.

* cited by examiner

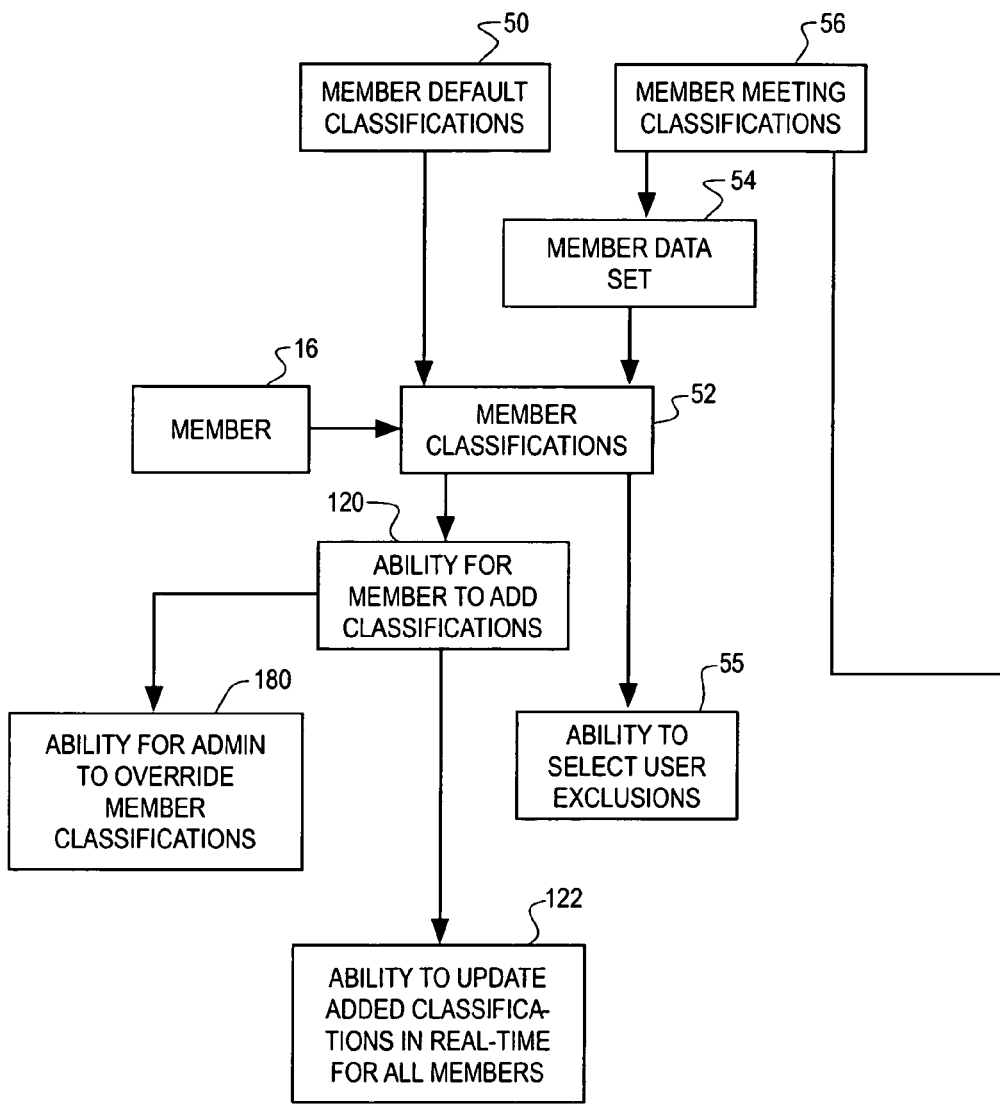

Fig. 13

Schedule created on Tuesday, June 14th 2005 01:24 PM
for eXtreme Summer Kickoff on Tuesday, June 14th 2005 05:00 PM Schedule for Tony Bagdy

| Round | Timeslot | Location | Side | Partner | Type |
|---|---|---|---|---|---|
| 1 | 5:00:00pm 5:05:00pm | 16 | Sox | Pal Johnson | C-Level Executive |
| 2 | 5:05:45pm 5:10:45pm | 3 | Sox | Andy Mercker | Sales/Marketing |
| 3 | 5:11:30pm 5:16:30pm | 10 | Sox | Christos Zafiropoulos | Sales/Marketing |
| 4 | 5:17:15pm 5:22:15pm | 12 | Sox | Elizabeth Berglund | Public Relations |
| 5 | 5:23:00pm 5:28:00pm | 7 | Sox | William Buck | Sales/Marketing |
| 6 | 5:28:45pm 5:33:45pm | 13 | Sox | Jordan Weil | Information Technology |
| 7 | 5:34:30pm 5:39:30pm | 16 | Sox | Scott Upp | Information Technology |
| 8 | 5:40:15pm 5:45:15pm | 11 | Sox | David Krull | Information Technology |
| 9 | 5:46:00pm 5:51:00pm | 14 | Sox | Mark Roth | Media |
| 10 | 5:51:45pm 5:56:45pm | 16 | Cubs | Timothy Osgood | Electronics Recycler |
| 11 | 5:57:30pm 6:02:30pm | 13 | Sox | Joe Rickard | Sales/Marketing |
| 12 | 6:03:15pm 6:08:15pm | 5 | Sox | Angie Hutson | Sales/Marketing |
| 13 | 6:09:00pm 6:14:00pm | 16 | Sox | John Lee | C-Level Executive |
| 14 | 6:14:45pm 6:19:45pm | 15 | Sox | Pete Parenti | C-Level Executive |
| 15 | 6:20:30pm 6:25:30pm | 12 | Sox | Donald Bussell | Corporate Coach |
| 16 | 6:26:15pm 6:31:15pm | 16 | Sox | Jennifer Mounce | Corporate Coach |
| 17 | 6:32:00pm 6:37:00pm | 9 | Sox | Chris Gallagher | Electronics Recycler |
| 18 | 6:37:45pm 6:42:45pm | 15 | Sox | Mike Montgomery | Web Design |
| 19 | 6:43:30pm 6:48:30pm | 3 | Sox | Art Mertes | Legal |
| 20 | 6:49:15pm 6:54:15pm | 2 | Sox | Andy Margolis | Owner |

Your use of this software is subject to the software license agreement and terms and conditions from ePrairie.com.Inc.

Fig. 28

| | | | | |
|---|---|---|---|---|
| | | Schedule for Andy Margolis | | |
| | | eXtreme Summer Kickoff | | |
| | | Friday, June 14th 2024 05:00 PM (registration begins at 04:00PM) | | |
| Timeslot | Location | Side | Partner | Type |
| 1. 5:00:00pm - 5:05:00pm | 2 | Cubs | Kristen Streeter | Legal |
| 2. 5:05:45pm - 5:10:45pm | 2 | Cubs | Christos Zafiropoulos | Sales/Marketing |
| 3. 5:11:30pm - 5:16:30pm | 2 | Cubs | Les Multack | Information Technology |
| 4. 5:17:15pm - 5:22:15pm | 2 | Cubs | Jennifer Mounce | Corporate Coach |
| 5. 5:23:00pm - 5:28:00pm | 2 | Cubs | Roman Fakhrazeyev | Software Architect |
| 6. 5:28:45pm - 5:33:45pm | 1 | Sox | Anthony Gerardi | Investor/VC |
| 7. 5:34:30pm - 5:39:30pm | 2 | Cubs | Mark Rosh | Media |
| 8. 5:40:15pm - 5:45:15pm | 2 | Cubs | Bart Loethen | Legal |
| 9. 5:46:00pm - 5:51:00pm | 2 | Cubs | Chris Gallagher | Electronics Recycler |
| 10. 5:51:45pm - 5:56:45pm | 2 | Cubs | Chris Novak | Owner |
| 11. 5:57:30pm - 6:02:30pm | 2 | Cubs | Mike Montgomery | Web Design |
| 12. 6:03:15pm - 6:08:15pm | 2 | Cubs | Brad Kempski | Telecom/ISP |
| 13. 6:09:00pm - 6:14:00pm | 2 | Cubs | Art Mertes | Legal |

Fig. 30

Roster Preferences

Your "preference" is your desire to meet this type of person from 1 (least) - 10 (most).
Choosing "No Meet" means that you will not be scheduled to meet people of that type.
You may not have more than 3 "no Meets" for this event.
Note: Selecting "no meet" for a type can prevent the scheduler from providing you with a full list of meetings. Only select "no meet" if you are absolutely sure that you do not want to meet with people that particular type. Otherwise, please select "1" to indicate a strong preference for not meeting people of that type.

| Attendee Type | Attendee Preference |
|---|---|
| Accounting | 2 |
| Biotech/Nanotech | 7 |
| C-Level Executive | 10 |
| Corporate Coach | 5 |
| Developer | 1 |
| Electronics Recycler | 5 |
| Engineer | 2 |
| Government | 8 |
| Higher Education | 5 |
| Human Relations | 7 |
| Information Technology | 7 |
| Investment Banker | 5 |
| Investor/VC | 2 |
| Legal | 5 |
| Manufacturing | 5 |
| Media | 7 |
| Non-Profit | 2 |
| Owner | 7 |

COMPUTER SYSTEM AND METHOD FOR HANDLING ENCOUNTERS

I. RELATED APPLICATION

The present patent application claims benefit from and incorporates by reference, U.S. Patent Application Ser. No. 60/607,066, filed Sep. 1, 2004.

II. COMPUTER CODE APPENDIX

A portion of the disclosure of this patent document contains material that is subject to copyright protection. The copyright owner has no objection to a statutory fair use of this material, as it appears in the files of the files or records of the U.S. Patent and Trademark Office, but otherwise reserves all copyright rights whatsoever. Computer code (as an appendix incorporated herein) is provided on the enclosed two (2) CD-ROM discs. Each disc contains the same information as the other. The files included on these discs are as follows.

| Name | Type | Modified | Size | Ratio |
| --- | --- | --- | --- | --- |
| Root | File | 3/16/2004 12:29 PM | 21 | 0% |
| Entries | File | 8/17/2005 5:25 PM | 1,969 | 61% |
| Repository | File | 3/16/2004 12:29 PM | 18 | 0% |
| bio.php | PHP File | 3/26/2004 10:53 AM | 250 | 34% |
| Readme | File | 10/18/2004 12:42 PM | 3,818 | 55% |
| logout.php | PHP File | 4/1/2004 5:01 PM | 236 | 31% |
| schedulemaker.php | PHP File | 10/4/2004 11:46 AM | 14,805 | 73% |
| billing.php | PHP File | 4/1/2004 11:01 AM | 250 | 34% |
| config.php | PHP File | 8/18/2005 12:31 PM | 1,163 | 44% |
| Root | File | 2/8/2005 5:18 PM | 20 | 0% |
| Repository | File | 2/8/2005 5:18 PM | 23 | 0% |
| Entries | File | 2/8/2005 5:34 PM | 1,355 | 86% |
| banner.gif | GIF Image | 2/8/2005 12:26 PM | 4,166 | 0% |
| botcellback.gif | GIF Image | 2/8/2005 12:26 PM | 344 | 0% |
| bottom.gif | GIF Image | 2/8/2005 12:26 PM | 431 | 0% |
| button.gif | GIF Image | 2/8/2005 12:26 PM | 793 | 0% |
| buttonb.gif | GIF Image | 2/8/2005 12:26 PM | 793 | 0% |
| cellback.gif | GIF Image | 2/8/2005 12:26 PM | 231 | 0% |
| index.html | HTML Document | 2/8/2005 12:26 PM | 2,429 | 54% |
| index2.htm | HTML Document | 2/8/2005 12:26 PM | 6,129 | 71% |
| intro.gif | GIF Image | 2/8/2005 12:26 PM | 145,402 | 5% |
| intro.swf | Shockwave Flash | 2/8/2005 12:26 PM | 32,087 | 0% |
| middle.jpg | JPEG Image | 2/8/2005 12:26 PM | 18,920 | 6% |
| story1.jpg | JPEG Image | 2/8/2005 12:26 PM | 10,665 | 0% |
| story2.jpg | JPEG Image | 2/8/2005 12:26 PM | 8,054 | 1% |
| story3.jpg | JPEG Image | 2/8/2005 12:26 PM | 7,667 | 1% |
| topleft.gif | GIF Image | 2/8/2005 12:26 PM | 2,673 | 1% |
| topleft2.gif | GIF Image | 2/8/2005 12:26 PM | 5,693 | 2% |
| training1.htm | HTML Document | 2/8/2005 12:26 PM | 6,452 | 69% |
| training1.swf | Shockwave Flash | 2/8/2005 12:26 PM | 28,204 | 0% |
| training2.htm | HTML Document | 2/8/2005 12:26 PM | 6,778 | 70% |
| training2.swf | Shockwave Fla . . . | 2/8/2005 12:26 PM | 53,190 | 0% |
| training3.htm | HTML Document | 2/8/2005 12:26 PM | 6,841 | 70% |
| training3.swf | Shockwave Fla . . . | 2/8/2005 12:26 PM | 37,353 | 0% |
| training4.htm | HTML Document | 2/8/2005 12:26 PM | 6,843 | 70% |
| training4.swf | Shockwave Fla . . . | 2/8/2005 12:26 PM | 49,168 | 0% |
| training5.htm | HTML Document | 2/8/2005 12:26 PM | 6,521 | 69% |
| training5.swf | Shockwave Fla . . . | 2/8/2005 12:26 PM | 15,734 | 0% |
| training6.htm | HTML Document | 2/8/2005 12:26 PM | 6,581 | 70% |
| training6.swf | Shockwave Fla . . . | 2/8/2005 12:26 PM | 10,405 | 0% |
| training7.htm | HTML Document | 2/8/2005 12:26 PM | 6,554 | 70% |
| training7.swf | Shockwave Fla . . . | 2/8/2005 12:26 PM | 7,891 | 0% |
| Root | File | 2/8/2005 5:34 PM | 20 | 0% |
| Repository | File | 2/8/2005 5:34 PM | 31 | 0% |
| Entries | File | 2/8/2005 5:34 PM | 1,001 | 84% |
| siteMenu__contact-over.gif | GIF Image | 2/8/2005 12:26 PM | 378 | 0% |
| siteMenu__contact.gif | GIF Image | 2/8/2005 12:26 PM | 378 | 0% |
| siteMenu__home-over.gif | GIF Image | 2/8/2005 12:26 PM | 318 | 3% |
| siteMenu__home.gif | GIF Image | 2/8/2005 12:26 PM | 318 | 3% |
| siteMenu__inTheNews-over.gif | GIF Image | 2/8/2005 12:26 PM | 596 | 10% |
| siteMenu__inTheNews.gif | GIF Image | 2/8/2005 12:26 PM | 596 | 9% |
| siteMenu__login-over.gif | GIF Image | 2/8/2005 12:26 PM | 318 | 3% |
| siteMenu__login.gif | GIF Image | 2/8/2005 12:26 PM | 245 | 4% |
| siteMenu__logout-over.gif | GIF Image | 2/8/2005 12:26 PM | 238 | 0% |
| siteMenu__logout.gif | GIF Image | 2/8/2005 12:26 PM | 236 | 0% |
| siteMenu__pastEvents-over.gif | GIF Image | 2/8/2005 12:26 PM | 601 | 9% |
| siteMenu__pastEvents.gif | GIF Image | 2/8/2005 12:26 PM | 391 | 0% |
| siteMenu__register-over.gif | GIF Image | 2/8/2005 12:26 PM | 534 | 13% |
| siteMenu__register.gif | GIF Image | 2/8/2005 12:26 PM | 328 | 2% |
| siteMenu__signup-over.gif | GIF Image | 2/8/2005 12:26 PM | 481 | 15% |
| siteMenu__signup.gif | GIF Image | 2/8/2005 12:26 PM | 289 | 3% |
| siteMenu__sponsors-over.gif | GIF Image | 2/8/2005 12:26 PM | 553 | 12% |
| siteMenu__sponsors.gif | GIF Image | 2/8/2005 12:26 PM | 553 | 12% |
| deployment.txt | Text Document | 4/22/2004 5:58 PM | 575 | 40% |

-continued

| Name | Type | Modified | Size | Ratio |
|---|---|---|---|---|
| globalDefines.php | PHP File | 2/2/2005 4:00 PM | 584 | 39% |
| contract.php | PHP File | 7/16/2004 6:23 PM | 279 | 38% |
| scheduler.cfg | CFG File | 4/12/2005 12:38 PM | 530 | 58% |
| stylesheet.css | Cascading Styl . . . | 5/17/2005 10:41 AM | 1,667 | 62% |
| content.php | PHP File | 3/4/2005 1:21 PM | 235 | 34% |
| event.php | PHP File | 3/26/2004 10:53 AM | 250 | 34% |
| register.php | PHP File | 3/26/2004 10:53 AM | 212 | 30% |
| signup.php | PHP File | 3/26/2004 10:53 AM | 250 | 34% |
| eventSchedules.php | PHP File | 8/31/2004 11:23 AM | 186 | 25% |
| userMain.php | PHP File | 3/31/2004 10:34 AM | 250 | 34% |
| rosterAttendee.php | PHP File | 3/31/2004 4:36 PM | 250 | 34% |
| Root | File | 3/19/2004 11:25 AM | 20 | 0% |
| Entries | File | 1/24/2005 1:35 PM | 91 | 20% |
| Repository | File | 3/19/2004 11:25 AM | 28 | 0% |
| terms.html | HTML Document | 3/29/2004 7:05 PM | 1,060 | 44% |
| notfound.html | HTML Document | 3/19/2004 10:49 AM | 13 | 0% |
| viewSchedules.php | PHP File | 8/31/2004 11:23 AM | 186 | 25% |
| viewstylesheet.css | Cascading Styl . . . | 3/31/2004 4:35 PM | 268 | 40% |
| rosterOwner.php | PHP File | 3/31/2004 2:08 PM | 250 | 34% |
| Root | File | 4/12/2004 6:36 PM | 20 | 0% |
| Repository | File | 4/12/2004 6:36 PM | 24 | 0% |
| Entries | File | 7/13/2005 2:18 PM | 452 | 50% |
| index.php | PHP File | 4/12/2004 10:41 AM | 185 | 25% |
| listAccounts.php | PHP File | 4/12/2004 10:41 AM | 185 | 25% |
| listEvents.php | PHP File | 4/12/2004 10:41 AM | 185 | 25% |
| Root | File | 4/12/2004 6:36 PM | 20 | 0% |
| Repository | File | 4/12/2004 6:36 PM | 37 | 0% |
| Entries | File | 3/8/2005 6:03 PM | 886 | 67% |
| cCreateEventController.php | PHP File | 6/30/2004 4:10 PM | 674 | 59% |
| cIndexController.php | PHP File | 6/30/2004 4:10 PM | 434 | 42% |
| cIndexView.php | PHP File | 6/30/2004 4:10 PM | 167 | 19% |
| cListAccountsController.php | PHP File | 6/30/2004 4:10 PM | 1,156 | 59% |
| cListAccountsView.php | PHP File | 2/2/2005 4:35 PM | 1,288 | 62% |
| cListEventsController.php | PHP File | 11/12/2004 1:41 PM | 1,232 | 60% |
| cListEventsView.php | PHP File | 12/6/2004 2:42 PM | 1,797 | 66% |
| cCreateEventView.php | PHP File | 6/30/2004 4:10 PM | 477 | 48% |
| cEditTypesController.php | PHP File | 7/13/2004 9:29 AM | 2,026 | 70% |
| cEditTypesView.php | PHP File | 7/13/2004 9:29 AM | 940 | 60% |
| cAdminBaseController.php | PHP File | 6/11/2004 5:30 AM | 1,144 | 63% |
| cAdminBaseView.php | PHP File | 6/11/2004 5:30 AM | 685 | 50% |
| cEncryptPasswordsController.php | PHP File | 11/5/2004 4:30 PM | 2,354 | 67% |
| cEncryptPasswordsView.php | PHP File | 10/18/2004 2:06 AM | 1,105 | 63% |
| cListPricesController.php | PHP File | 2/2/2005 4:05 PM | 4,321 | 73% |
| cListPricesView.php | PHP File | 2/15/2005 6:34 PM | 4,516 | 78% |
| createEvent.php | PHP File | 5/10/2004 2:33 PM | 185 | 25% |
| editTypes.php | PHP File | 2/2/2005 2:46 PM | 185 | 25% |
| encryptPasswords.php | PHP File | 10/18/2004 2:04 AM | 185 | 25% |
| orphanedBios.php | PHP File | 10/5/2004 4:12 PM | 539 | 41% |
| listPrices.php | PHP File | 11/12/2004 1:40 PM | 185 | 25% |
| impersonateUser.php | PHP File | 7/12/2005 6:04 PM | 296 | 30% |
| Root | File | 3/26/2004 3:00 PM | 20 | 0% |
| Entries | File | 7/29/2005 1:03 PM | 476 | 50% |
| Repository | File | 3/26/2004 3:00 PM | 26 | 0% |
| pastEvents.html | HTML Document | 4/21/2005 4:37 PM | 6,419 | 71% |
| register.html | HTML Document | 5/20/2005 7:03 PM | 3,441 | 57% |
| sponsors.html | HTML Document | 1/24/2005 2:11 PM | 3,980 | 68% |
| contact.html | HTML Document | 1/24/2005 2:11 PM | 412 | 34% |
| homePage.html | HTML Document | 4/21/2005 4:37 PM | 2,777 | 58% |
| notfound.html | HTML Document | 1/24/2005 1:35 PM | 779 | 44% |
| inTheNews.html | HTML Document | 1/24/2005 2:11 PM | 2,638 | 62% |
| .#inTheNews.html.1.2 | 2 File | 7/28/2005 12:06 AM | 2,013 | 59% |
| pageUnavailable.html | HTML Document | 8/31/2004 10:54 AM | 110 | 16% |
| .#pastEvents.html.1.5 | 5 File | 2/24/2005 11:29 AM | 6,079 | 71% |
| license.html | HTML Document | 7/28/2005 4:25 PM | 1,635 | 48% |
| testimonials.html | HTML Document | 7/29/2005 1:03 PM | 6,432 | 71% |
| Root | File | 3/26/2004 3:00 PM | 20 | 0% |
| Entries | File | 8/10/2005 3:33 PM | 1,340 | 74% |
| Repository | File | 3/26/2004 3:00 PM | 30 | 0% |
| UserBios.php | PHP File | 8/1/2005 6:57 PM | 6,129 | 71% |
| Users.php | PHP File | 8/2/2005 5:17 PM | 13,870 | 79% |
| Billing.php | PHP File | 8/1/2005 6:57 PM | 1,982 | 71% |
| Schedules.php | PHP File | 8/1/2005 6:57 PM | 3,839 | 70% |
| Events.php | PHP File | 8/22/2005 6:12 PM | 26,078 | 77% |
| Root | File | 3/26/2004 3:00 PM | 20 | 0% |
| Entries | File | 12/3/2004 2:55 PM | 362 | 49% |
| Repository | File | 3/26/2004 3:00 PM | 38 | 0% |
| testRoster.csv | Microsoft Excel . . . | 3/30/2004 6:39 PM | 169 | 43% |
| attendeeTypes.csv | Microsoft Excel . . . | 3/30/2004 12:37 PM | 264 | 23% |

-continued

| Name | Type | Modified | Size | Ratio |
|---|---|---|---|---|
| loadTestRoster.php | PHP File | 3/30/2004 5:22 PM | 352 | 37% |
| cCsvDbUtils.php | PHP File | 3/30/2004 12:33 PM | 4,770 | 72% |
| loadAttendeeTypes.php | PHP File | 3/30/2004 12:39 PM | 334 | 38% |
| removeQuotes.php | PHP File | 6/17/2004 2:28 AM | 449 | 49% |
| updateEventAttendeeTypes.php | PHP File | 6/11/2004 7:56 AM | 2,075 | 70% |
| Root | File | 3/26/2004 3:00 PM | 20 | 0% |
| Entries | File | 8/10/2005 3:33 PM | 151 | 26% |
| Repository | File | 3/26/2004 3:00 PM | 34 | 0% |
| scheduler-backup.sql | SQL File | 8/17/2005 4:50 PM | 2,446,620 | 76% |
| updates.sql | SQL File | 8/17/2005 4:10 PM | 3,173 | 71% |
| scheduler.sql | SQL File | 8/17/2005 4:58 PM | 6,688,330 | 88% |
| scheduler__tables.sql | SQL File | 1/5/2005 12:07 PM | 8,454 | 84% |
| scheduler__data.sql | SQL File | 12/3/2004 1:20 PM | 157 | 26% |
| RosterMemberExcludedPeople.php | PHP File | 8/1/2005 6:57 PM | 1,309 | 62% |
| RosterMembers.php | PHP File | 8/1/2005 6:57 PM | 9,385 | 76% |
| Prices.php | PHP File | 8/1/2005 6:57 PM | 7,403 | 74% |
| AttendeeTypes.php | PHP File | 8/1/2005 6:57 PM | 4,256 | 72% |
| EventOptions.php | PHP File | 8/1/2005 6:57 PM | 1,536 | 63% |
| RosterMemberTypePreferences.php | PHP File | 8/1/2005 6:57 PM | 1,312 | 63% |
| UserCredits.php | PHP File | 8/1/2005 6:57 PM | 4,094 | 73% |
| scheduler.ini | Configuration S . . . | 8/1/2005 6:57 PM | 4,106 | 72% |
| UserGroups.php | PHP File | 8/1/2005 6:57 PM | 827 | 52% |
| Images.php | PHP File | 8/1/2005 6:57 PM | 1,156 | 59% |
| RegistrationRequests.php | PHP File | 8/23/2005 6:57 PM | 2,795 | 65% |
| EventTablesRequiredFields.php | PHP File | 8/1/2005 6:57 PM | 943 | 55% |
| UserClasses.php | PHP File | 8/1/2005 6:57 PM | 789 | 52% |
| EventQuestions.php | PHP File | 8/1/2005 6:57 PM | 2,052 | 66% |
| EventAnswers.php | PHP File | 8/1/2005 6:57 PM | 1,297 | 60% |
| EventCustomEmailText.php | PHP File | 8/1/2005 6:57 PM | 978 | 55% |
| ScheduleMatches.php | PHP File | 8/1/2005 6:57 PM | 901 | 56% |
| ScheduleMeetings.php | PHP File | 8/1/2005 6:57 PM | 1,132 | 62% |
| SchedulePeople.php | PHP File | 8/1/2005 6:57 PM | 1,019 | 57% |
| SchedulePreferences.php | PHP File | 8/1/2005 6:57 PM | 968 | 58% |
| ScheduleTypes.php | PHP File | 8/1/2005 6:57 PM | 822 | 53% |
| Root | File | 3/26/2004 3:00 PM | 20 | 0% |
| Entries | File | 8/17/2005 1:07 PM | 4,100 | 79% |
| Repository | File | 3/26/2004 3:00 PM | 25 | 0% |
| inCrains.jpg | JPEG Image | 3/24/2004 5:36 AM | 30,511 | 35% |
| inRp.gif | GIF Image | 3/24/2004 5:36 AM | 4,729 | 0% |
| inTheNews.gif | GIF Image | 3/24/2004 5:36 AM | 321 | 0% |
| left.gif | GIF Image | 3/18/2004 5:11 AM | 7,456 | 0% |
| logo.gif | GIF Image | 3/18/2004 5:11 AM | 6,724 | 1% |
| pastRegister.gif | GIF Image | 3/24/2004 5:36 AM | 670 | 0% |
| redbullet.gif | GIF Image | 3/22/2004 7:31 PM | 58 | 10% |
| register.gif | GIF Image | 3/24/2004 2:49 AM | 262 | 0% |
| rightBorder.gif | GIF Image | 3/18/2004 5:11 AM | 83 | 7% |
| rightBorderBottom.gif | GIF Image | 3/18/2004 5:11 AM | 301 | 17% |
| siteMenu__bar.gif | GIF Image | 11/5/2004 6:47 PM | 3,353 | 0% |
| siteMenu__contact.gif | GIF Image | 7/25/2005 11:47 AM | 324 | 0% |
| siteMenu__corner.gif | GIF Image | 7/16/2004 6:23 PM | 160 | 0% |
| siteMenu__customerLogin-over.gif | GIF Image | 3/18/2004 5:11 AM | 671 | 10% |
| siteMenu__customerLogin.gif | GIF Image | 3/18/2004 5:11 AM | 671 | 10% |
| siteMenu__home-over.gif | GIF Image | 7/25/2005 11:47 AM | 257 | 0% |
| siteMenu__home.gif | GIF Image | 7/25/2005 11:47 AM | 257 | 0% |
| siteMenu__inTheNews-over.gif | GIF Image | 7/25/2005 11:47 AM | 422 | 0% |
| siteMenu__inTheNews.gif | GIF Image | 7/25/2005 11:47 AM | 422 | 0% |
| siteMenu__pastEvents-over.gif | GIF Image | 3/18/2004 5:11 AM | 601 | 9% |
| siteMenu__pastEvents.gif | GIF Image | 3/18/2004 5:11 AM | 601 | 8% |
| siteMenu__register.gif | GIF Image | 3/18/2004 5:11 AM | 534 | 12% |
| siteMenu__sponsors-over.gif | GIF Image | 7/25/2005 11:47 AM | 363 | 0% |
| siteMenu__sponsors.gif | GIF Image | 7/25/2005 11:47 AM | 363 | 0% |
| spacer.gif | GIF Image | 3/18/2004 5:11 AM | 43 | 26% |
| sponsors.gif | GIF Image | 3/24/2004 2:49 AM | 265 | 0% |
| sponsorsCec.gif | GIF Image | 3/24/2004 2:49 AM | 5,631 | 2% |
| sponsorsChampaign.gif | GIF Image | 3/24/2004 2:49 AM | 6,948 | 2% |
| sponsorsCore.gif | GIF Image | 3/24/2004 2:49 AM | 981 | 5% |
| sponsorsCtt.gif | GIF Image | 3/24/2004 2:49 AM | 5,970 | 2% |
| sponsorsHeilio.gif | GIF Image | 3/24/2004 2:49 AM | 3,786 | 1% |
| sponsorsIlcoal.gif | GIF Image | 3/24/2004 2:49 AM | 5,711 | 2% |
| sponsorsLasalle.gif | GIF Image | 3/24/2004 2:49 AM | 2,694 | 25% |
| sponsorsMason.gif | GIF Image | 3/24/2004 2:49 AM | 3,698 | 0% |
| sponsorsMicrosoft.gif | GIF Image | 3/24/2004 2:49 AM | 3,150 | 0% |
| sponsorsPwc.gif | GIF Image | 3/24/2004 2:49 AM | 3,556 | 2% |
| sponsorsYeo.gif | GIF Image | 3/24/2004 2:49 AM | 7,317 | 2% |
| story1.jpg | JPEG Image | 3/24/2004 2:49 AM | 10,665 | 0% |
| story2.jpg | JPEG Image | 3/24/2004 2:49 AM | 8,054 | 1% |
| story3.jpg | JPEG Image | 3/24/2004 2:49 AM | 7,667 | 1% |
| siteMenu__login-over.gif | GIF Image | 3/31/2004 12:46 AM | 318 | 3% |

-continued

| Name | Type | Modified | Size | Ratio |
|---|---|---|---|---|
| siteMenu_login.gif | GIF Image | 3/31/2004 12:46 AM | 318 | 4% |
| siteMenu_signup.gif | GIF Image | 3/31/2004 12:46 AM | 481 | 16% |
| contact.gif | GIF Image | 4/1/2004 1:39 PM | 249 | 0% |
| login.gif | GIF Image | 4/1/2004 1:39 PM | 200 | 0% |
| signup.gif | GIF Image | 4/1/2004 1:39 PM | 235 | 0% |
| homeCorner.jpg | JPEG Image | 3/24/2004 2:50 AM | 9,381 | 1% |
| homeNext.gif | GIF Image | 3/22/2004 7:31 PM | 304 | 0% |
| pastEvents.gif | GIF Image | 3/24/2004 2:49 AM | 312 | 0% |
| siteMenu_contact-over.gif | GIF Image | 7/25/2005 11:47 AM | 324 | 0% |
| siteMenu_register-over.gif | GIF Image | 3/18/2004 5:11 AM | 534 | 13% |
| sponsorsUnified.gif | GIF Image | 3/24/2004 2:49 AM | 5,175 | 3% |
| homeIf.gif | GIF Image | 3/24/2004 2:49 AM | 370 | 0% |
| siteMenu_signup-over.gif | GIF Image | 3/31/2004 12:46 AM | 481 | 15% |
| Root | File | 4/12/2004 6:36 PM | 20 | 0% |
| Repository | File | 4/12/2004 6:36 PM | 31 | 0% |
| Entries | File | 6/4/2004 5:57 PM | 171 | 47% |
| idelete.gif | GIF Image | 4/12/2004 10:45 AM | 387 | 10% |
| iedit.gif | GIF Image | 4/12/2004 10:45 AM | 609 | 18% |
| user.gif | GIF Image | 4/12/2004 10:45 AM | 159 | 3% |
| money.gif | GIF Image | 5/18/2004 11:43 AM | 561 | 26% |
| printlogo.jpg | JPEG Image | 4/16/2004 5:37 AM | 12,651 | 3% |
| siteMenu_logout-over.gif | GIF Image | 7/7/2004 2:35 AM | 238 | 0% |
| siteMenu_logout.gif | GIF Image | 7/7/2004 2:35 AM | 236 | 0% |
| siteMenu_userMenu-over.gif | GIF Image | 7/8/2004 3:31 AM | 319 | 0% |
| siteMenu_userMenu.gif | GIF Image | 7/8/2004 3:31 AM | 321 | 0% |
| questionIcon.gif | GIF Image | 10/14/2004 11:12 AM | 125 | 0% |
| attendingTitle.gif | GIF Image | 10/14/2004 11:55 AM | 494 | 0% |
| createTitle.gif | GIF Image | 10/14/2004 11:55 AM | 495 | 0% |
| reset.gif | GIF Image | 11/17/2004 5:03 PM | 413 | 0% |
| inNG.jpg | JPEG Image | 12/1/2004 1:59 AM | 50,311 | 0% |
| inNG2.jpg | JPEG Image | 12/1/2004 1:59 AM | 465,655 | 0% |
| signupButton.gif | GIF Image | 12/1/2004 1:02 AM | 514 | 0% |
| left.jpg | JPEG Image | 1/21/2005 4:17 PM | 21,202 | 1% |
| viralGroupLogo.gif | GIF Image | 2/3/2005 12:12 PM | 4,089 | 2% |
| CCTBlogo.gif | GIF Image | 4/21/2005 4:25 AM | 1,160 | 0% |
| groupbl.gif | GIF Image | 5/3/2005 2:41 PM | 82 | 0% |
| groupbr.gif | GIF Image | 5/3/2005 2:41 PM | 80 | 0% |
| grouptl.gif | GIF Image | 5/3/2005 2:41 PM | 82 | 0% |
| grouptr.gif | GIF Image | 5/3/2005 2:41 PM | 80 | 0% |
| siteMenu_license-over.gif | GIF Image | 7/21/2005 4:03 AM | 313 | 0% |
| siteMenu_license.gif | GIF Image | 7/21/2005 4:03 AM | 313 | 0% |
| siteMenu_testimonials-over.gif | GIF Image | 7/21/2005 4:03 AM | 452 | 0% |
| siteMenu_testimonials.gif | GIF Image | 7/21/2005 4:03 AM | 452 | 0% |
| license.gif | GIF Image | 7/25/2005 2:15 PM | 260 | 0% |
| testimonials.gif | GIF Image | 7/25/2005 2:15 PM | 353 | 0% |
| exampleEventLogo.gif | GIF Image | 8/11/2005 4:37 AM | 2,847 | 0% |
| exampleEventText.gif | GIF Image | 8/11/2005 4:37 AM | 3,872 | 0% |
| rosterDropdown.gif | GIF Image | 8/11/2005 3:10 AM | 2,725 | 0% |
| Root | File | 3/26/2004 3:00 PM | 20 | 0% |
| Entries | File | 7/25/2005 11:47 AM | 457 | 49% |
| Repository | File | 3/26/2004 3:00 PM | 28 | 0% |
| frame-user.tpl | TPL File | 7/25/2005 11:47 AM | 1,384 | 49% |
| frame.tpl | TPL File | 7/25/2005 11:47 AM | 958 | 51% |
| print.tpl | TPL File | 8/27/2004 6:06 PM | 682 | 45% |
| frame-admin.tpl | TPL File | 5/9/2005 7:14 PM | 959 | 45% |
| Root | File | 4/12/2004 6:36 PM | 20 | 0% |
| Repository | File | 4/12/2004 6:36 PM | 34 | 0% |
| Entries | File | 7/13/2005 2:18 PM | 335 | 40% |
| adminMenu.tpl | TPL File | 11/12/2004 1:45 PM | 988 | 60% |
| listAccounts.tpl | TPL File | 7/13/2005 2:16 PM | 2,199 | 69% |
| listEvents.tpl | TPL File | 12/6/2004 2:59 PM | 2,150 | 68% |
| editTypes.tpl | TPL File | 7/13/2004 9:29 AM | 1,340 | 73% |
| encryptPasswords.tpl | TPL File | 10/18/2004 2:09 AM | 239 | 33% |
| listPrices.tpl | TPL File | 2/2/2005 3:40 PM | 2,756 | 77% |
| implogin.tpl | TPL File | 7/13/2005 12:52 PM | 1,312 | 59% |
| footerrows.tpl | TPL File | 7/13/2005 1:31 PM | 652 | 40% |
| frame-login.tpl | TPL File | 7/25/2005 11:47 AM | 1,088 | 52% |
| metatext.tpl | TPL File | 8/25/2004 2:09 PM | 990 | 62% |
| Root | File | 11/17/2004 1:53 PM | 20 | 0% |
| Repository | File | 11/17/2004 1:53 PM | 34 | 0% |
| Entries | File | 8/10/2005 3:33 PM | 634 | 61% |
| resetPassword.txt | Text Document | 7/29/2005 10:11 AM | 492 | 46% |
| .#resetPassword.txt.1.1 | 1 File | 11/17/2004 1:57 PM | 379 | 44% |
| .#resetPassword.txt.1.2 | 2 File | 11/17/2004 5:15 PM | 766 | 59% |
| signupEmail.txt | Text Document | 12/3/2004 6:43 PM | 325 | 40% |
| registrationApproved.txt | Text Document | 7/29/2005 10:11 AM | 205 | 27% |
| registrationAckowleged.txt | Text Document | 7/29/2005 10:11 AM | 286 | 36% |
| failedSignupNotice.txt | Text Document | 7/29/2005 10:11 AM | 403 | 38% |

-continued

| Name | Type | Modified | Size | Ratio |
|---|---|---|---|---|
| rosterSignupNotice.txt | Text Document | 7/25/2005 6:01 PM | 381 | 41% |
| Root | File | 5/20/2005 7:04 PM | 20 | 0% |
| Repository | File | 5/20/2005 7:04 PM | 54 | 0% |
| Entries | File | 7/29/2005 1:03 PM | 57 | 0% |
| attendeeAcknowlege.txt | Text Document | 7/29/2005 10:13 AM | 307 | 39% |
| rosterCancellationNotice.txt | Text Document | 7/25/2005 4:03 PM | 385 | 39% |
| registrationCancelled.txt | Text Document | 7/29/2005 10:11 AM | 222 | 29% |
| bioChangeNotice.txt | Text Document | 7/29/2005 10:11 AM | 259 | 28% |
| preferenceChangeNotice.txt | Text Document | 7/29/2005 10:11 AM | 335 | 37% |
| userConfirmation.txt | Text Document | 8/22/2005 2:08 PM | 543 | 42% |
| Root | File | 3/26/2004 3:00 PM | 20 | 0% |
| Entries | File | 7/25/2005 5:26 PM | 145 | 20% |
| Repository | File | 3/26/2004 3:00 PM | 38 | 0% |
| bio.tpl | TPL File | 5/9/2005 7:14 PM | 2,710 | 70% |
| rosterAttendee.tpl | TPL File | 7/18/2005 6:39 PM | 10,880 | 79% |
| .#rosterAttendee.tpl.1.25 | 25 File | 10/13/2004 7:45 PM | 6,457 | 75% |
| rosterAddFail.tpl | TPL File | 12/3/2004 6:09 PM | 124 | 27% |
| Root | File | 3/26/2004 3:00 PM | 20 | 0% |
| Entries | File | 8/10/2005 3:33 PM | 750 | 54% |
| Repository | File | 3/26/2004 3:00 PM | 35 | 0% |
| script.tpl | TPL File | 2/8/2005 5:34 PM | 1,254 | 66% |
| siteMenu.tpl | TPL File | 7/25/2005 11:47 AM | 6,233 | 86% |
| userMain.tpl | TPL File | 7/25/2005 1:51 PM | 3,179 | 67% |
| userMenu.tpl | TPL File | 7/25/2005 1:21 PM | 820 | 61% |
| billing.tpl | TPL File | 7/18/2005 1:09 PM | 4,888 | 77% |
| event.tpl | TPL File | 8/1/2005 5:30 PM | 8,426 | 80% |
| nextEvent.tpl | TPL File | 1/5/2005 11:54 AM | 455 | 49% |
| contactus.tpl | TPL File | 5/18/2005 12:16 PM | 1,977 | 59% |
| billingHistory.tpl | TPL File | 5/9/2005 7:14 PM | 2,563 | 73% |
| login.tpl | TPL File | 8/10/2005 3:29 PM | 3,319 | 70% |
| signup.tpl | TPL File | 7/25/2005 11:35 AM | 1,823 | 69% |
| contract.tpl | TPL File | 7/8/2004 5:43 AM | 180 | 29% |
| editaccount.tpl | TPL File | 7/25/2005 11:34 AM | 2,525 | 75% |
| .#event.tpl.1.34 | 34 File | 5/3/2005 2:29 PM | 10,390 | 82% |
| eventNavBlock.tpl | TPL File | 5/18/2005 12:28 PM | 906 | 54% |
| resetPassword.tpl | TPL File | 11/17/2004 5:25 PM | 1,656 | 64% |
| setupFeeDescription.tpl | TPL File | 2/15/2005 6:44 PM | 490 | 43% |
| Root | File | 3/26/2004 3:00 PM | 20 | 0% |
| Entries | File | 8/17/2005 1:07 PM | 408 | 45% |
| Repository | File | 3/26/2004 3:00 PM | 38 | 0% |
| schedule.tpl | TPL File | 8/22/2005 6:26 PM | 11,990 | 75% |
| eventInformation.tpl | TPL File | 8/17/2005 1:07 PM | 9,816 | 78% |
| viewSchedule.tpl | TPL File | 5/18/2005 6:45 PM | 1,844 | 71% |
| rosterOwner.tpl | TPL File | 7/19/2005 6:45 PM | 9,242 | 74% |
| allEvents.tpl | TPL File | 5/17/2005 10:41 AM | 1,131 | 66% |
| .#eventInformation.tpl.1.7 | 7 File | 5/19/2005 11:14 AM | 9,615 | 78% |
| scheduleNotAvailable.tpl | TPL File | 12/2/2004 1:49 PM | 265 | 31% |
| eventEditCustomEmail.tpl | TPL File | 5/23/2005 5:11 PM | 1,364 | 67% |
| .#eventInformation.tpl.1.8 | 8 File | 5/20/2005 7:03 PM | 10,819 | 79% |
| eventConfig.tpl | TPL File | 8/22/2005 5:58 PM | 5,661 | 76% |
| event_email.txt | Text Document | 1/5/2005 12:52 PM | 551 | 44% |
| Root | File | 2/7/2005 1:33 PM | 20 | 0% |
| Repository | File | 2/7/2005 1:33 PM | 39 | 0% |
| Entries | File | 8/10/2005 2:37 PM | 54 | 0% |
| viralGroupLogin.txt | Text Document | 2/7/2005 1:33 PM | 472 | 43% |
| Root | File | 3/26/2004 3:00 PM | 20 | 0% |
| Entries | File | 8/17/2005 1:07 PM | 3,143 | 72% |
| Repository | File | 3/26/2004 3:00 PM | 31 | 0% |
| cBaseView.php | PHP File | 8/2/2005 2:59 PM | 3,212 | 64% |
| cBioForm.php | PHP File | 7/22/2005 10:34 AM | 800 | 56% |
| cBioView.php | PHP File | 5/18/2005 1:44 PM | 1,149 | 57% |
| cContentController.php | PHP File | 3/4/2005 1:11 PM | 423 | 42% |
| cContentView.php | PHP File | 1/6/2005 4:11 PM | 846 | 56% |
| cContractController.php | PHP File | 7/16/2004 6:23 PM | 716 | 51% |
| cContractView.php | PHP File | 7/16/2004 6:23 PM | 943 | 59% |
| cEventController.php | PHP File | 8/10/2005 3:27 PM | 7,701 | 74% |
| cEventForm.php | PHP File | 7/19/2005 6:08 PM | 5,222 | 69% |
| cSchedulerAuthController.php | PHP File | 8/2/2005 5:38 PM | 3,431 | 73% |
| cSchedulerAuthView.php | PHP File | 3/19/2005 10:49 AM | 114 | 13% |
| cSignupController.php | PHP File | 8/2/2005 5:28 PM | 3,197 | 64% |
| cSignupForm.php | PHP File | 8/2/2005 2:47 PM | 2,913 | 66% |
| cSignupView.php | PHP File | 8/2/2005 12:54 PM | 1,259 | 60% |
| viewfunctions.php | PHP File | 11/17/2004 8:08 PM | 5,425 | 65% |
| cEventSchedulesController.php | PHP File | 1/5/2005 7:15 PM | 11,106 | 73% |
| cBioController.php | PHP File | 7/25/2005 7:11 PM | 4,299 | 70% |
| cResetPasswordController.php | PHP File | 11/17/2004 5:15 PM | 1,643 | 63% |
| cEventView.php | PHP File | 8/2/2005 4:45 PM | 3,177 | 67% |
| cUserMainController.php | PHP File | 7/13/2005 2:54 PM | 867 | 52% |

-continued

| Name | Type | Modified | Size | Ratio |
|---|---|---|---|---|
| cUserMainView.php | PHP File | 7/25/2005 1:57 PM | 6,306 | 71% |
| cRosterAttendeeController.php | PHP File | 7/25/2005 6:07 PM | 13,258 | 73% |
| cRosterOwnerController.php | PHP File | 8/22/2005 1:08 PM | 13,005 | 75% |
| cRosterAttendeeView.php | PHP File | 7/25/2005 5:51 PM | 7,638 | 73% |
| temp.php | PHP File | 8/22/2005 1:08 PM | 13,606 | 75% |
| cViewSchedulesController.php | PHP File | 5/17/2005 1:10 PM | 3,627 | 68% |
| cViewSchedulesView.php | PHP File | 1/5/2005 3:41 PM | 1,581 | 66% |
| .#viewfunctions.php.1.1 | 1 File | 3/31/2004 6:28 PM | 3,525 | 64% |
| cUserBaseView.php | PHP File | 8/1/2005 6:35 PM | 2,559 | 69% |
| cRosterOwnerView.php | PHP File | 5/17/2005 1:16 PM | 5,961 | 73% |
| .#viewfunctions.php.1.2 | 2 File | 3/31/2004 6:33 PM | 3,684 | 65% |
| cAuthController.php | PHP File | 8/2/2005 5:31 PM | 2,827 | 69% |
| cBillingController.php | PHP File | 4/28/2005 9:20 PM | 7,873 | 69% |
| cBillingForm.php | PHP File | 4/2/2004 7:01 PM | 3,789 | 65% |
| cBillingView.php | PHP File | 7/18/2005 11:55 AM | 2,739 | 69% |
| cEventSchedulesView.php | PHP File | 8/22/2005 6:14 PM | 4,438 | 72% |
| cEditAccountView.php | PHP File | 7/25/2005 11:59 AM | 1,616 | 66% |
| cBaseController.php | PHP File | 3/4/2005 12:36 PM | 1,805 | 63% |
| cEditAccountController.php | PHP File | 7/25/2005 12:22 PM | 2,608 | 69% |
| cResetPasswordForm.php | PHP File | 11/17/2004 5:15 PM | 1,117 | 57% |
| cAuthView.php | PHP File | 8/10/2005 2:56 PM | 3,192 | 70% |
| cMessageView.php | PHP File | 6/30/2004 4:10 PM | 434 | 38% |
| cContactusController.php | PHP File | 5/26/2005 11:10 AM | 2,411 | 66% |
| cContactusView.php | PHP File | 6/30/2004 4:10 PM | 1,028 | 56% |
| cUserBaseController.php | PHP File | 3/4/2005 1:01 PM | 960 | 57% |
| cBillingHistoryController.php | PHP File | 7/25/2005 1:13 PM | 582 | 46% |
| cBillingHistoryView.php | PHP File | 2/15/2005 7:00 PM | 3,606 | 69% |
| cResetPasswordView.php | PHP File | 11/17/2004 4:49 AM | 1,254 | 64% |
| cRosterAttendeeForm.php | PHP File | 1/5/2005 4:03 PM | 1,874 | 59% |
| .#cResetPasswordController.php.1.2 | 2 File | 11/17/2004 2:01 PM | 1,560 | 65% |
| cAlleventsView.php | PHP File | 4/29/2005 6:02 PM | 1,083 | 57% |
| cEventInfoView.php | PHP File | 5/17/2005 1:05 PM | 1,221 | 58% |
| cEventInfoController.php | PHP File | 5/2/2005 1:07 PM | 1,176 | 56% |
| cAlleventsController.php | PHP File | 4/29/2005 2:41 PM | 526 | 46% |
| cEventEditCustomEmailController.php | PHP File | 5/18/2005 6:41 PM | 1,729 | 62% |
| cEventEditCustomEmailView.php | PHP File | 5/18/2005 6:56 PM | 1,241 | 57% |
| cImpAuthView.php | PHP File | 8/2/2005 12:28 PM | 1,086 | 57% |
| cEventConfigController.php | PHP File | 8/1/2005 4:24 PM | 3,876 | 72% |
| cEventConfigView.php | PHP File | 8/22/2005 5:59 PM | 1,483 | 62% |
| cEventConfigForm.php | PHP File | 8/17/2005 1:07 PM | 1,905 | 63% |
| cConfirmController.php | PHP File | 8/2/2005 6:09 PM | 1,570 | 60% |
| cConfirmView.php | PHP File | 8/2/2005 4:46 PM | 320 | 33% |
| contactus.php | PHP File | 4/8/2004 11:47 AM | 250 | 34% |
| index.php | PHP File | 3/4/2005 1:12 PM | 61 | 0% |
| Root | File | 3/31/2004 12:48 PM | 20 | 0% |
| Entries | File | 8/17/2005 5:25 PM | 1,386 | 59% |
| Repository | File | 3/31/2004 12:48 PM | 32 | 0% |
| cAuthorizeNetTransaction.php | PHP File | 4/2/2004 6:10 PM | 5,924 | 65% |
| cSchedulerCCTransaction.php | PHP File | 11/18/2004 5:01 PM | 313 | 34% |
| FormBuilder.php | PHP File | 10/5/2004 3:51 PM | 59,939 | 76% |
| cPrintBios.php | PHP File | 6/27/2005 12:54 PM | 5,310 | 72% |
| cPrintSchedules.php | PHP File | 8/27/2004 7:23 PM | 5,657 | 74% |
| Root | File | 4/19/2004 10:59 AM | 20 | 0% |
| Repository | File | 4/19/2004 10:59 AM | 37 | 0% |
| Entries | File | 7/25/2005 5:27 PM | 190 | 32% |
| cFPdfWrapper.php | PHP File | 7/21/2005 6:56 PM | 15,050 | 71% |
| fpdf.php | PHP File | 4/16/2004 10:52 AM | 41,478 | 75% |
| pdfglobals.php | PHP File | 9/22/2004 6:14 PM | 161 | 41% |
| Root | File | 4/19/2004 10:59 AM | 20 | 0% |
| Repository | File | 4/19/2004 10:59 AM | 42 | 0% |
| Entries | File | 4/19/2004 10:59 AM | 511 | 77% |
| courier.php | PHP File | 4/16/2004 10:52 AM | 257 | 63% |
| helvetica.php | PHP File | 4/16/2004 10:52 AM | 3,162 | 72% |
| helveticab.php | PHP File | 4/16/2004 10:52 AM | 3,162 | 73% |
| helveticabi.php | PHP File | 4/16/2004 10:52 AM | 3,163 | 72% |
| helveticai.php | PHP File | 4/16/2004 10:52 AM | 3,163 | 72% |
| symbol.php | PHP File | 4/16/2004 10:52 AM | 3,086 | 70% |
| times.php | PHP File | 4/16/2004 10:52 AM | 3,154 | 73% |
| timesb.php | PHP File | 4/16/2004 10:52 AM | 3,160 | 73% |
| timesbi.php | PHP File | 4/16/2004 10:52 AM | 3,157 | 73% |
| timesi.php | PHP File | 4/16/2004 10:52 AM | 3,153 | 73% |
| zapfdingbats.php | PHP File | 4/16/2004 10:52 AM | 3,051 | 67% |
| Root | File | 4/19/2004 10:59 AM | 20 | 0% |
| Repository | File | 4/19/2004 10:59 AM | 51 | 2% |
| Entries | File | 4/19/2004 10:59 AM | 945 | 86% |
| cp1250.map | MAP File | 4/16/2004 10:52 AM | 4,546 | 62% |
| cp1251.map | MAP File | 4/16/2004 10:52 AM | 4,776 | 63% |
| cp1252.map | MAP File | 4/16/2004 10:52 AM | 4,541 | 63% |

-continued

| Name | Type | Modified | Size | Ratio |
|---|---|---|---|---|
| cp1253.map | MAP File | 4/16/2004 10:52 AM | 4,255 | 61% |
| cp1254.map | MAP File | 4/16/2004 10:52 AM | 4,523 | 63% |
| cp1255.map | MAP File | 4/16/2004 10:52 AM | 4,298 | 62% |
| cp1257.map | MAP File | 4/16/2004 10:52 AM | 4,434 | 62% |
| cp1258.map | MAP File | 4/16/2004 10:52 AM | 4,493 | 62% |
| cp874.map | MAP File | 4/16/2004 10:52 AM | 4,263 | 62% |
| iso-8859-1.map | MAP File | 4/16/2004 10:52 AM | 4,605 | 65% |
| iso-8859-11.map | MAP File | 4/16/2004 10:52 AM | 4,689 | 64% |
| iso-8859-15.map | MAP File | 4/16/2004 10:52 AM | 4,579 | 65% |
| iso-8859-16.map | MAP File | 4/16/2004 10:52 AM | 4,625 | 64% |
| iso-8859-2.map | MAP File | 4/16/2004 10:52 AM | 4,569 | 64% |
| iso-8859-4.map | MAP File | 4/16/2004 10:52 AM | 4,588 | 64% |
| iso-8859-5.map | MAP File | 4/16/2004 10:52 AM | 4,719 | 66% |
| iso-8859-7.map | MAP File | 4/16/2004 10:52 AM | 4,430 | 63% |
| iso-8859-9.map | MAP File | 4/16/2004 10:52 AM | 4,623 | 65% |
| koi8-r.map | MAP File | 4/16/2004 10:52 AM | 4,739 | 63% |
| koi8-u.map | MAP File | 4/16/2004 10:52 AM | 4,739 | 63% |
| makefont.php | PHP File | 4/16/2004 10:52 AM | 10,475 | 69% |
| rpdf.php | PHP File | 9/22/2004 6:15 PM | 1,539 | 73% |
| rc4.php | PHP File | 10/18/2004 2:08 AM | 4,240 | 70% |
| cPrintNameTags.php | PHP File | 2/22/2005 1:55 PM | 5,929 | 70% |
| cPrintBase.php | PHP File | 6/29/2005 1:20 PM | 2,098 | 54% |
| cUtil.php | PHP File | 8/2/2005 4:12 PM | 834 | 47% |
| cBioPrintModel.php | PHP File | 7/13/2005 2:22 PM | 4,502 | 76% |
| .#cPrintNameTags.php.1.2 | 2 File | 8/16/2004 12:24 PM | 4,539 | 66% |
| cPrintSchedulePackets.php | PHP File | 7/21/2005 6:56 PM | 4,281 | 74% |
| cScheduleValidator.php | PHP File | 10/4/2004 11:47 AM | 6,733 | 75% |
| cPrintTableSigns.php | PHP File | 9/28/2004 12:30 PM | 4,166 | 67% |
| cScheduleEngine.php | PHP File | 8/18/2005 12:18 PM | 28,873 | 74% |
| .#FormBuilder.php.1.2 | 2 File | 10/5/2004 3:41 PM | 59,963 | 76% |
| cPrintPacketsBase.php | PHP File | 6/29/2005 12:44 PM | 4,456 | 69% |
| cPrintMatchesPackets.php | PHP File | 11/17/2004 8:02 PM | 3,127 | 70% |
| cEmail.php | PHP File | 8/23/2005 6:09 PM | 1,756 | 63% |
| cPrintUserSignupReport.php | PHP File | 6/29/2005 1:08 PM | 4,615 | 65% |
| cScheduleBiosCsv.php | PHP File | 6/29/2005 4:40 PM | 1,839 | 59% |
| cPasswordGenerator.data.gzWinZip | File | 11/11/2004 5:50 AM | 31,722 | 1% |
| cPasswordGenerator.php | PHP File | 11/17/2004 1:53 PM | 4,371 | 73% |
| cPrintAttendeePreferenceReport.php | PHP File | 2/22/2005 6:08 PM | 4,420 | 68% |
| cStandardBase.php | PHP File | 7/29/2005 12:43 PM | 2,156 | 63% |
| cImageHandler.php | PHP File | 7/29/2005 1:02 PM | 5,066 | 70% |
| cFormUtils.php | PHP File | 8/2/2005 3:06 PM | 9,751 | 64% |
| test.php | PHP File | 8/23/2005 6:11 PM | 266 | 35% |
| cSchedulerImageHandler.php | PHP File | 7/29/2005 12:42 PM | 464 | 44% |
| .#config.php.1.9 | 9 File | 4/2/2004 4:12 PM | 485 | 34% |
| applicationConfig.php | PHP File | 8/10/2005 3:34 PM | 1,904 | 44% |
| billingHistory.php | PHP File | 5/11/2004 3:35 AM | 250 | 34% |
| Root | File | 6/4/2004 5:57 PM | 20 | 0% |
| Repository | File | 6/4/2004 5:57 PM | 23 | 0% |
| Entries | File | 7/25/2005 6:09 PM | 151 | 23% |
| cCreditTest.php | PHP File | 8/10/2004 11:56 AM | 3,012 | 72% |
| .#cCreditTest.php.1.1 | 1 File | 7/20/2004 4:13 PM | 3,013 | 72% |
| compareSchedules.php | PHP File | 9/28/2004 12:16 PM | 4,200 | 71% |
| cPricesTest.php | PHP File | 7/25/2005 11:30 AM | 2,930 | 74% |
| print.php | PHP File | 8/18/2005 12:17 PM | 453 | 28% |
| .#print.php.1.1 | 1 File | 6/8/2004 6:38 PM | 866 | 66% |
| .#scheduler.cfg.1.4 | 4 File | 11/17/2004 12:57 PM | 533 | 59% |
| realprint.php | PHP File | 8/18/2005 12:19 PM | 4,103 | 74% |
| updateSchedules.php | PHP File | 8/31/2004 12:48 PM | 5,423 | 78% |
| database.php | PHP File | 8/24/2004 4:36 PM | 410 | 39% |
| download.php | PHP File | 8/18/2005 12:19 PM | 1,817 | 60% |
| .htaccess | HTACCESS File | 2/3/2005 3:56 PM | 335 | 43% |
| .#schedulemaker.php.1.7 | 7 File | 7/29/2004 1:10 PM | 17,521 | 75% |
| editAccount.php | PHP File | 10/18/2004 2:03 AM | 250 | 34% |
| eventInfo.php | PHP File | 5/18/2005 5:03 PM | 250 | 34% |
| allevents.php | PHP File | 4/29/2005 1:50 PM | 250 | 34% |
| browserDefines.php | PHP File | 6/29/2005 1:10 PM | 2,551 | 76% |
| Root | File | 6/29/2005 2:09 PM | 20 | 0% |
| Repository | File | 6/29/2005 2:09 PM | 26 | 0% |
| Entries | File | 6/29/2005 2:10 PM | 53 | 0% |
| resetPassword.php | PHP File | 11/17/2004 4:29 AM | 250 | 34% |
| eventEditCustomEmail.php | PHP File | 2/16/2005 2:11 PM | 250 | 34% |
| eventConfig.php | PHP File | 7/19/2005 6:37 PM | 250 | 34% |
| confirm.php | PHP File | 8/2/2005 4:08 PM | 250 | 34% |
| image.php | PHP File | 7/29/2005 11:08 AM | 224 | 28% |
| filesToUpdate.txt | Text Document | 8/10/2005 3:32 PM | 978 | 67% |

III. TECHNICAL FIELD

The technical field is computers and data processing systems. Depending on the implementation, there is apparatus, a method for use and method for making, and corresponding products produced thereby, as well as data structures, computer-readable media tangibly embodying program instructions, electronic transmission and reception systems, respectively, manufactures, and necessary intermediates of the foregoing, each pertaining to digital aspects of handling encounters.

IV. BRIEF DESCRIPTION OF THE DRAWINGS

Figure 2:
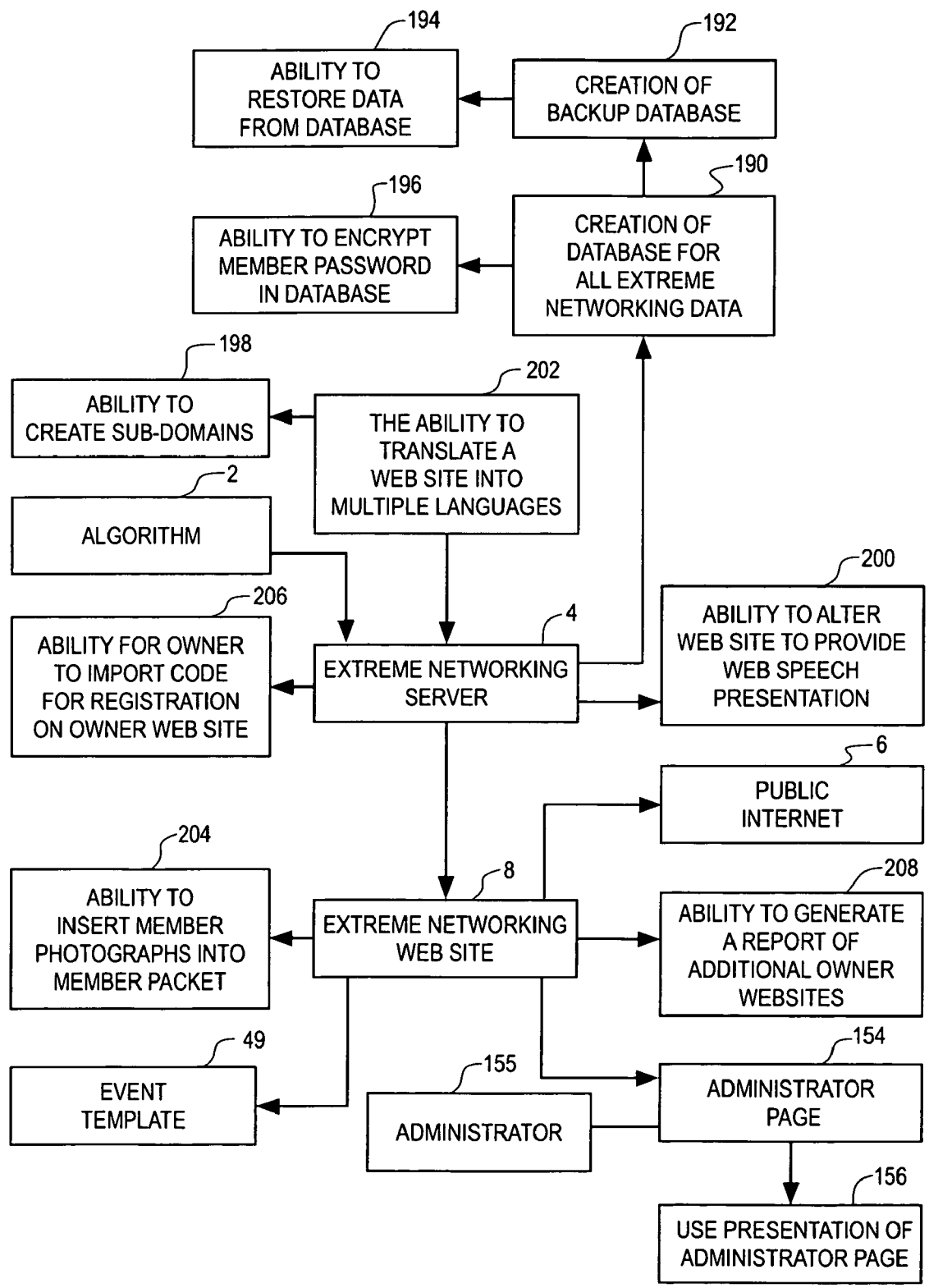
Figure 3B:
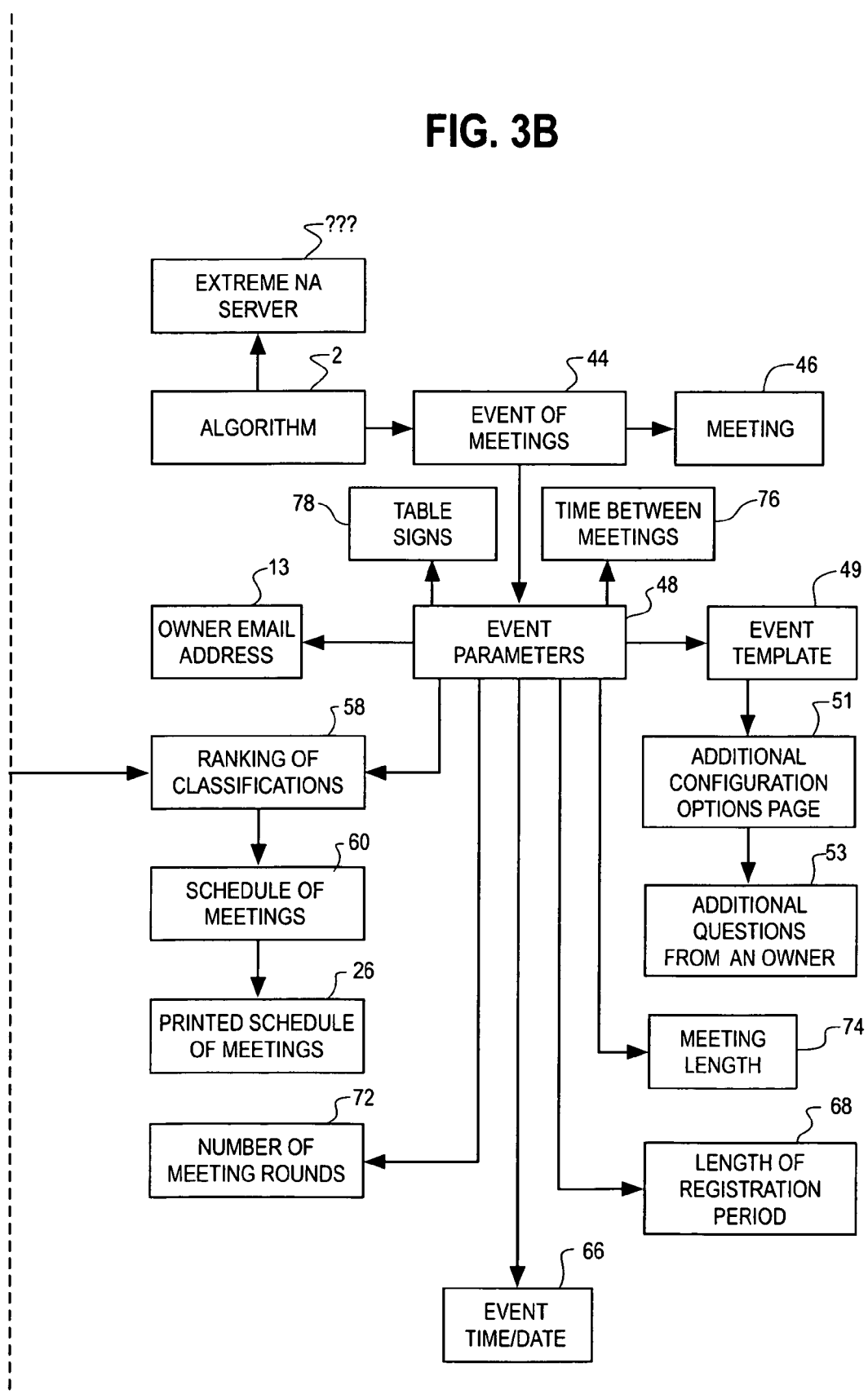
Figure 4:
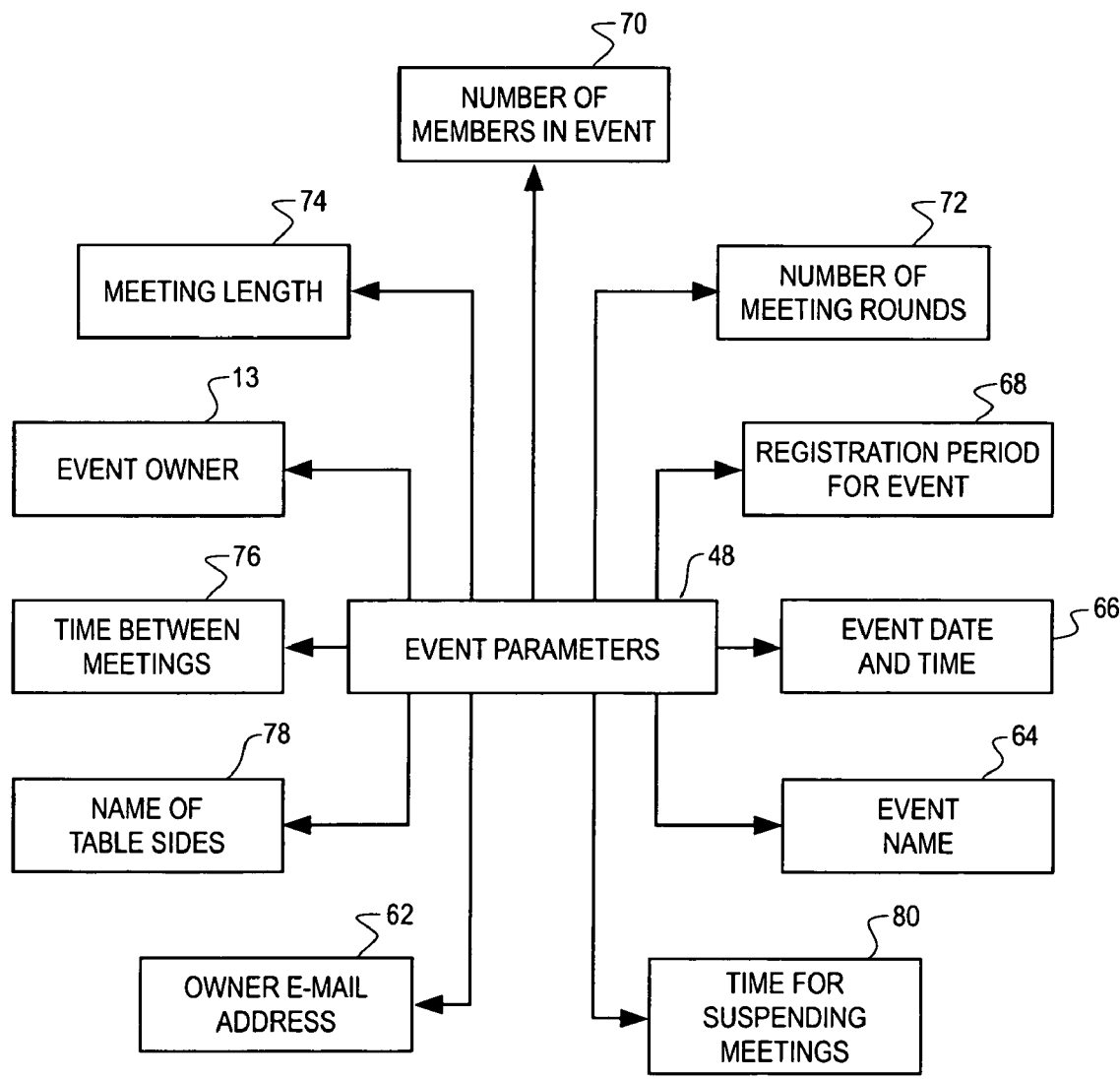
Figure 5:
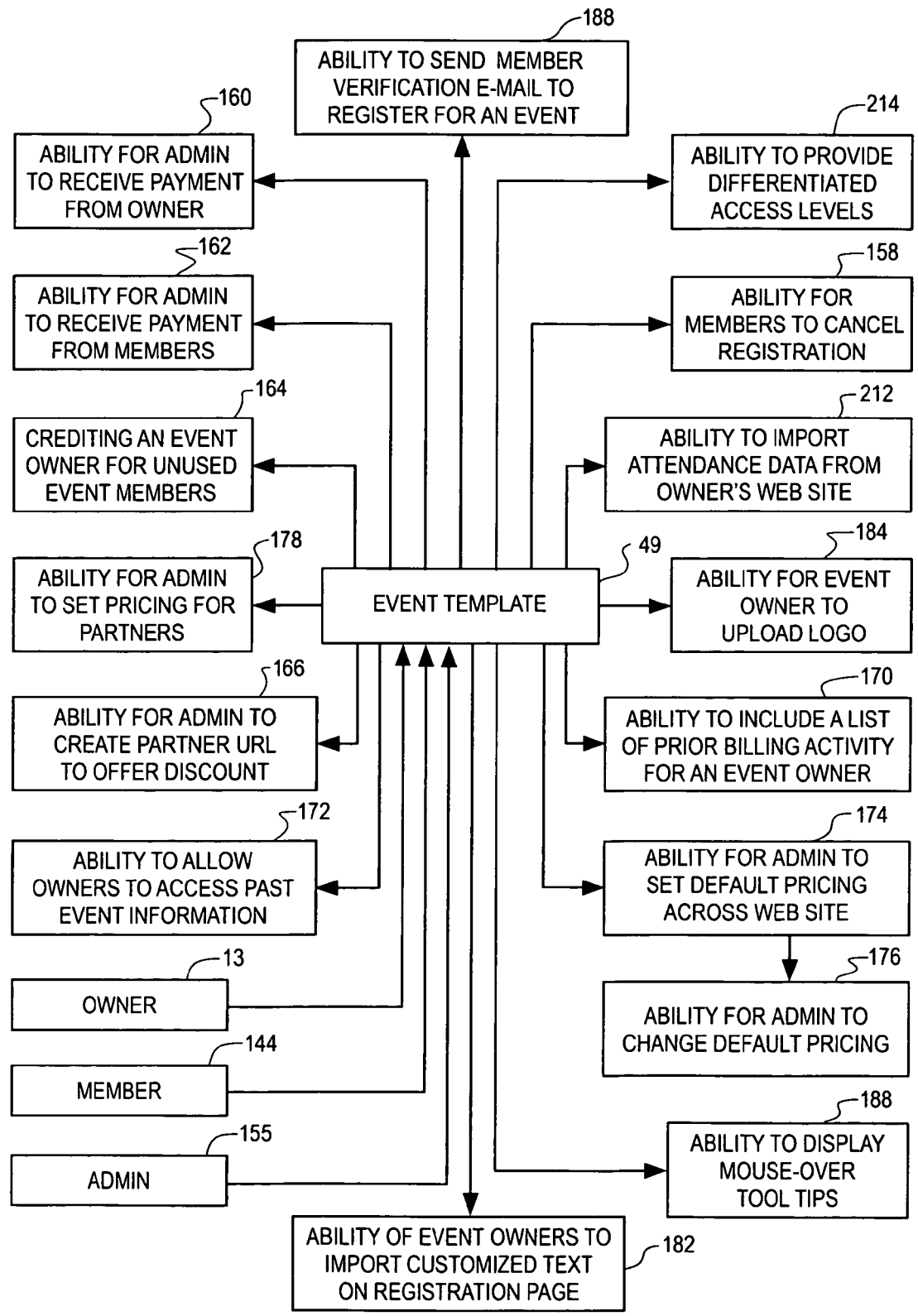
Figure 6:
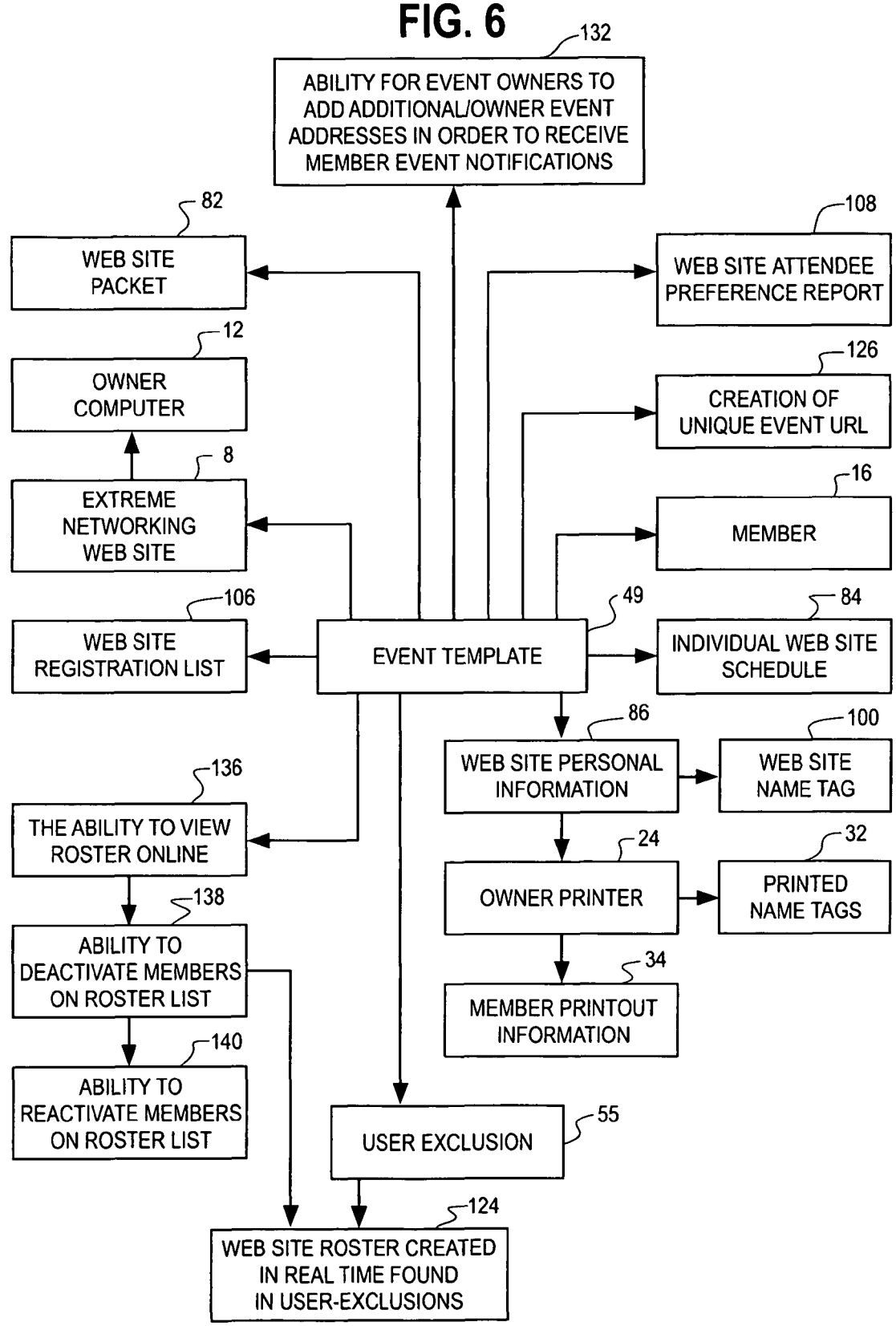
Figure 7:
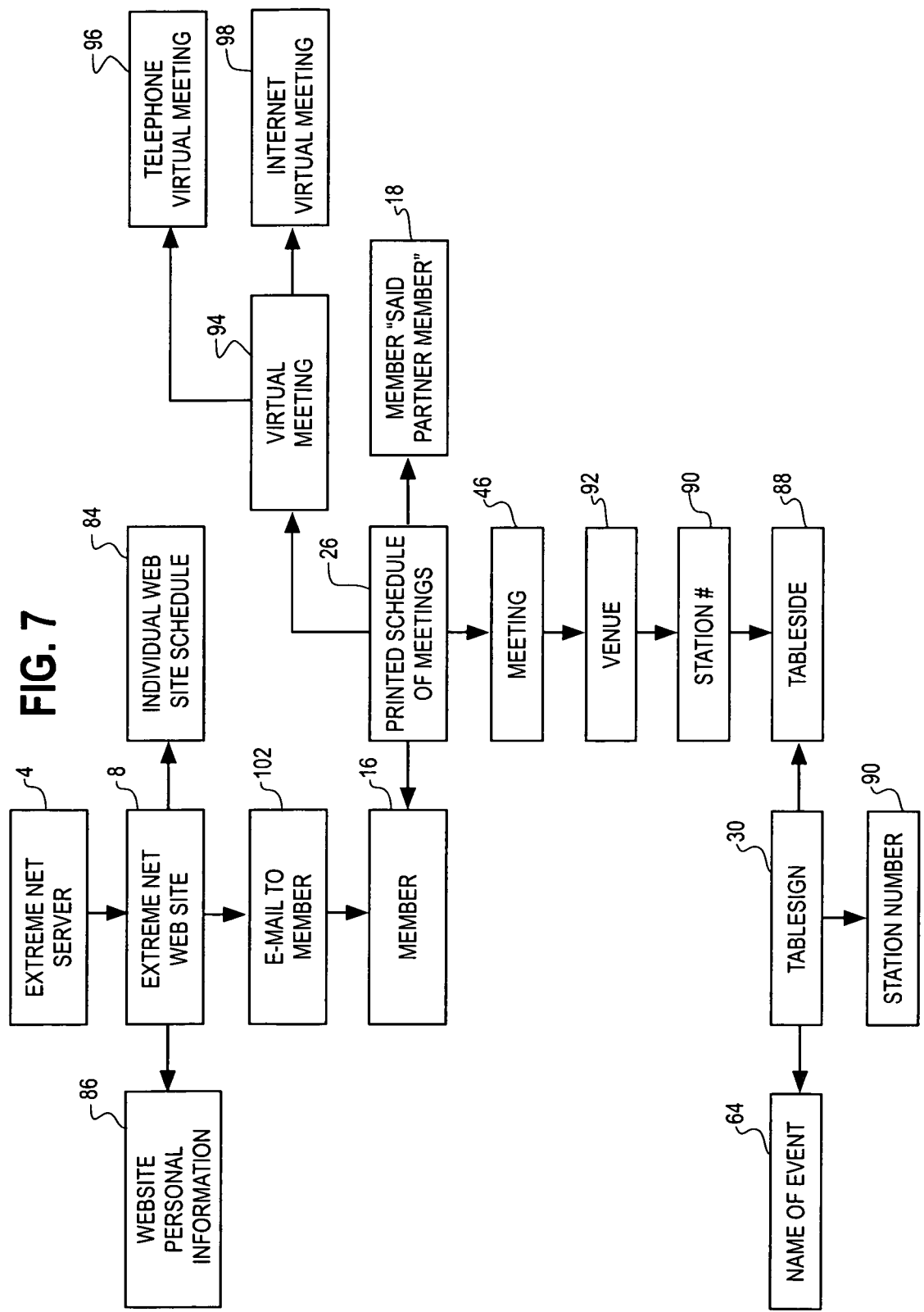
Figure 8:
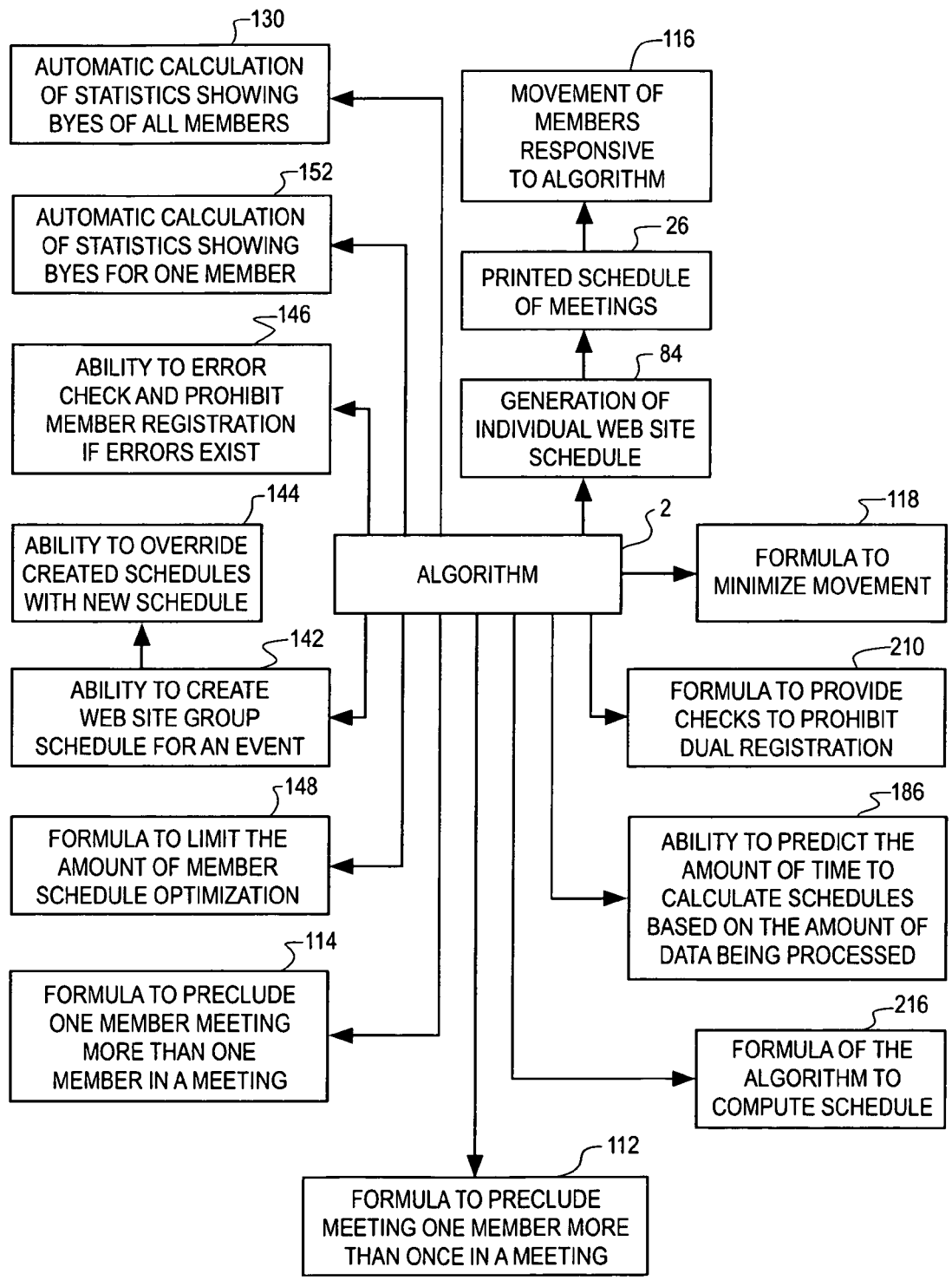
Figure 9:
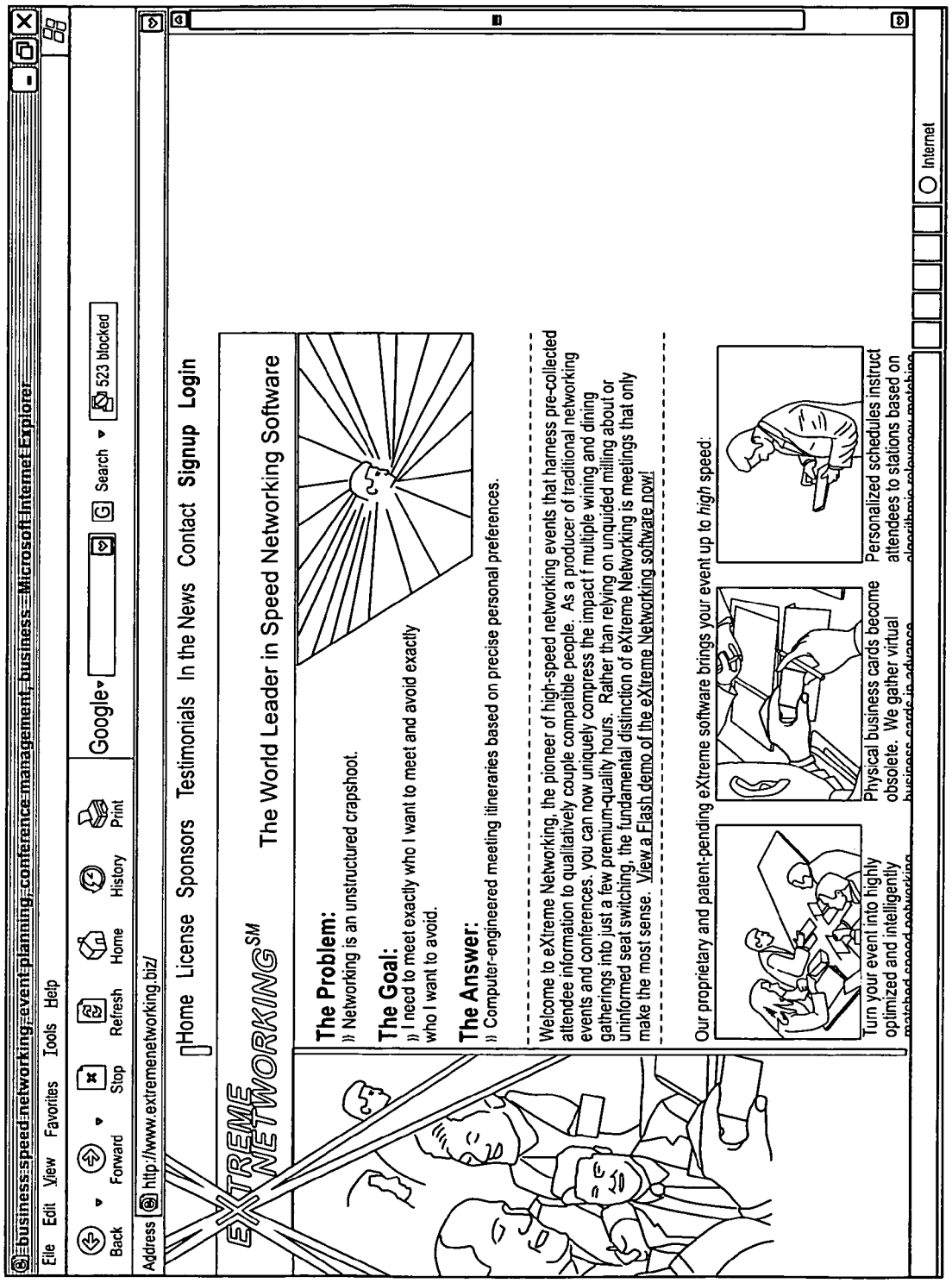
Figure 10:
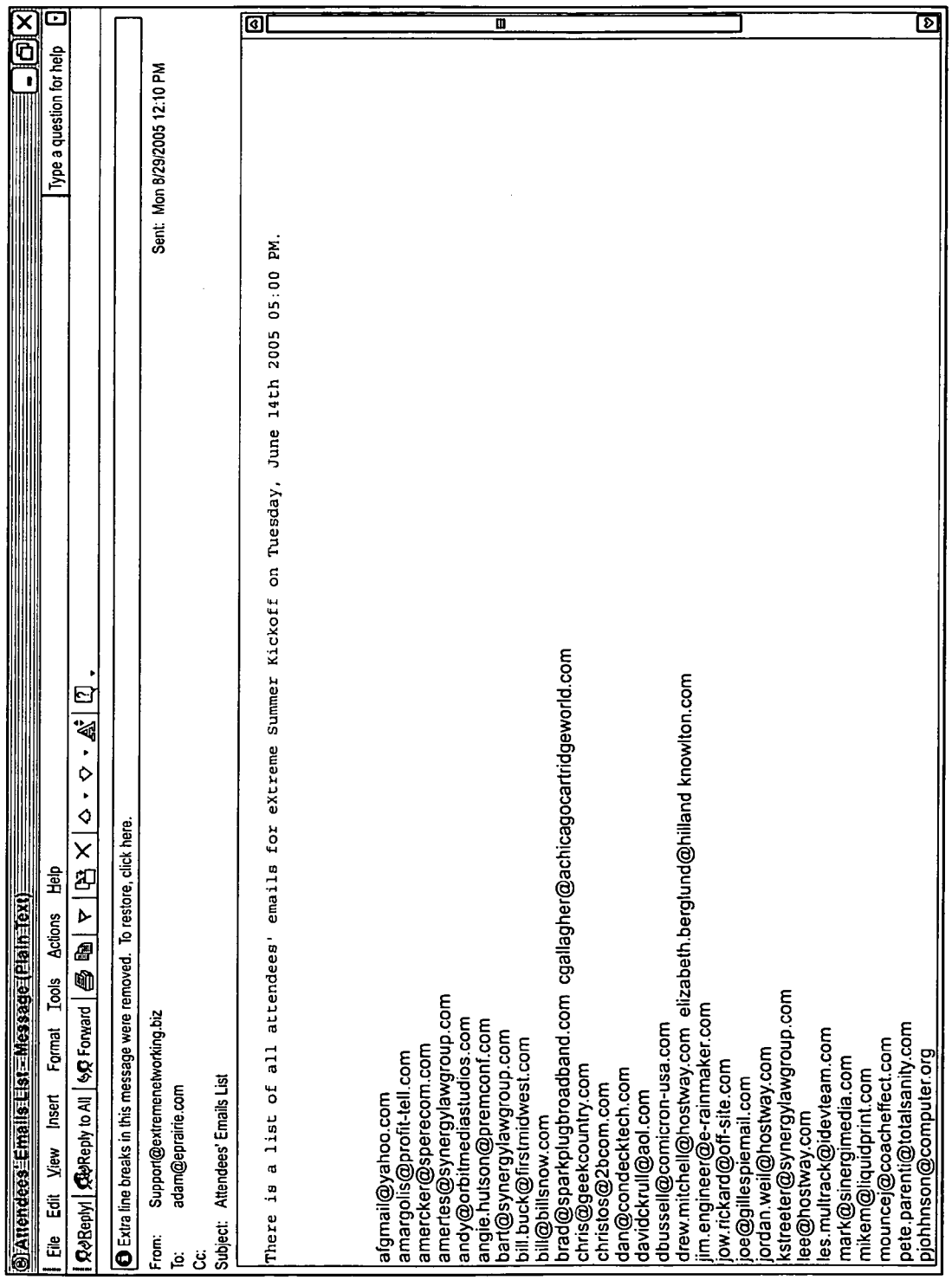
Figure 11:
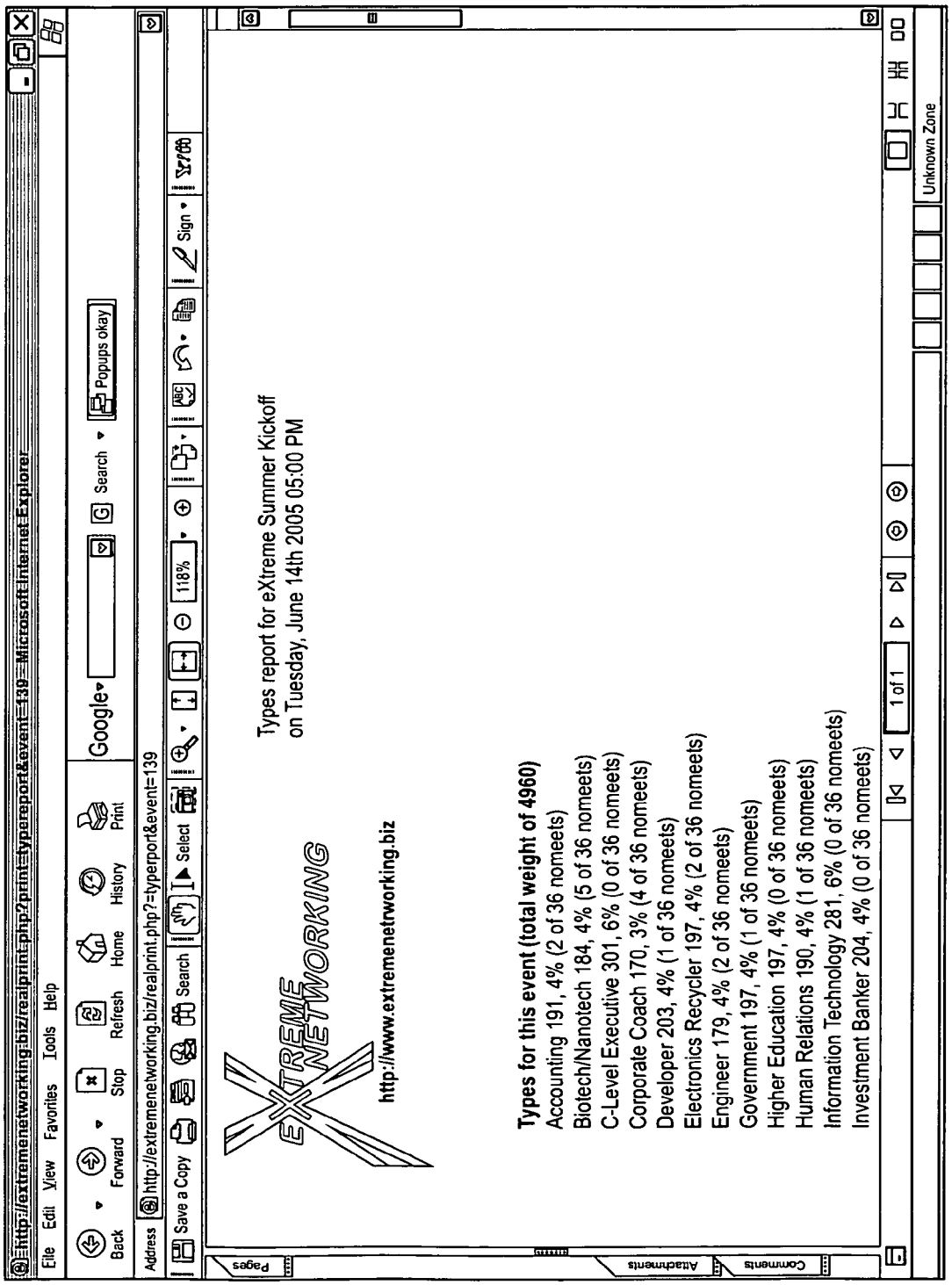
Figure 12:
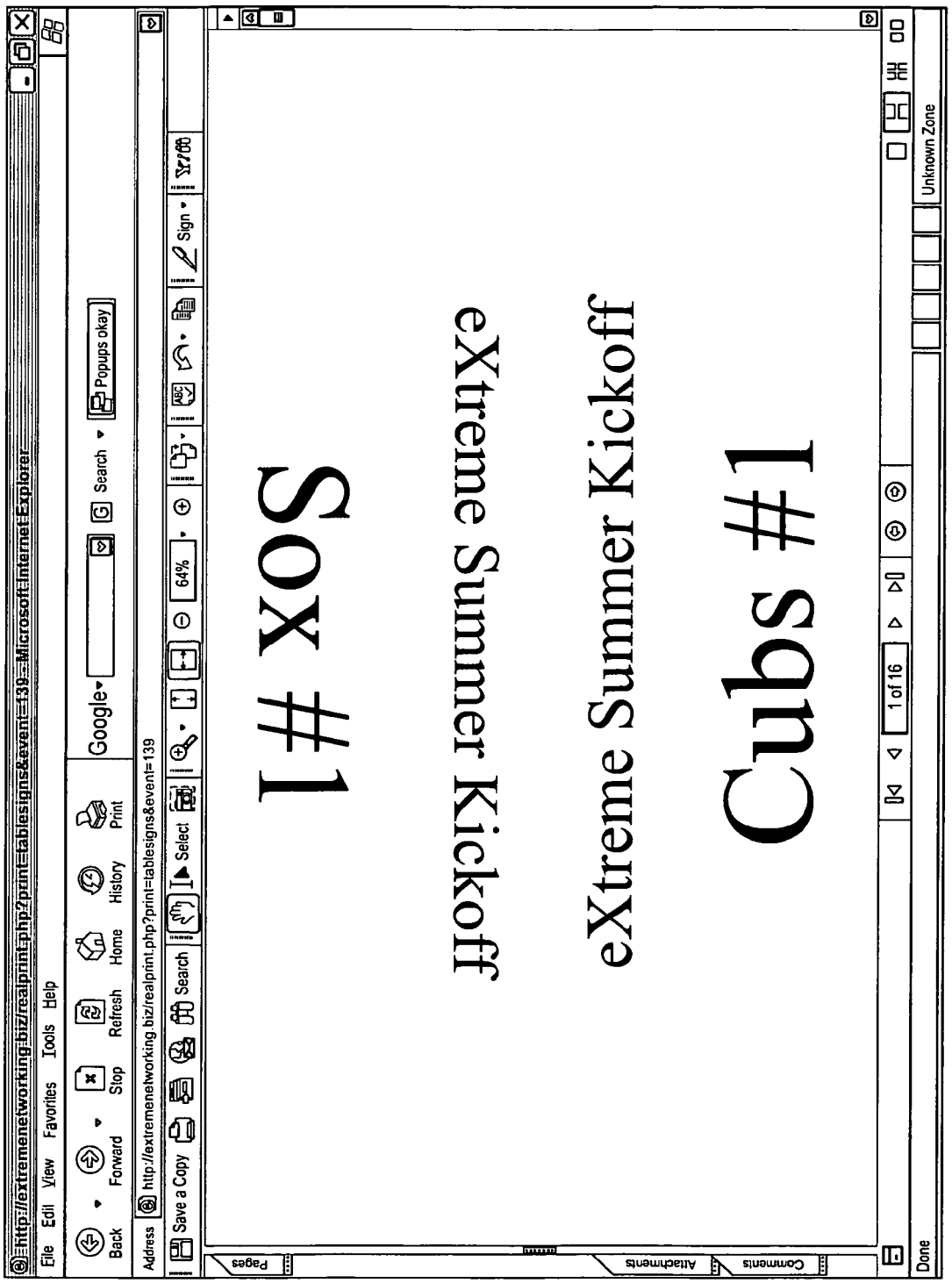
Figure 14:
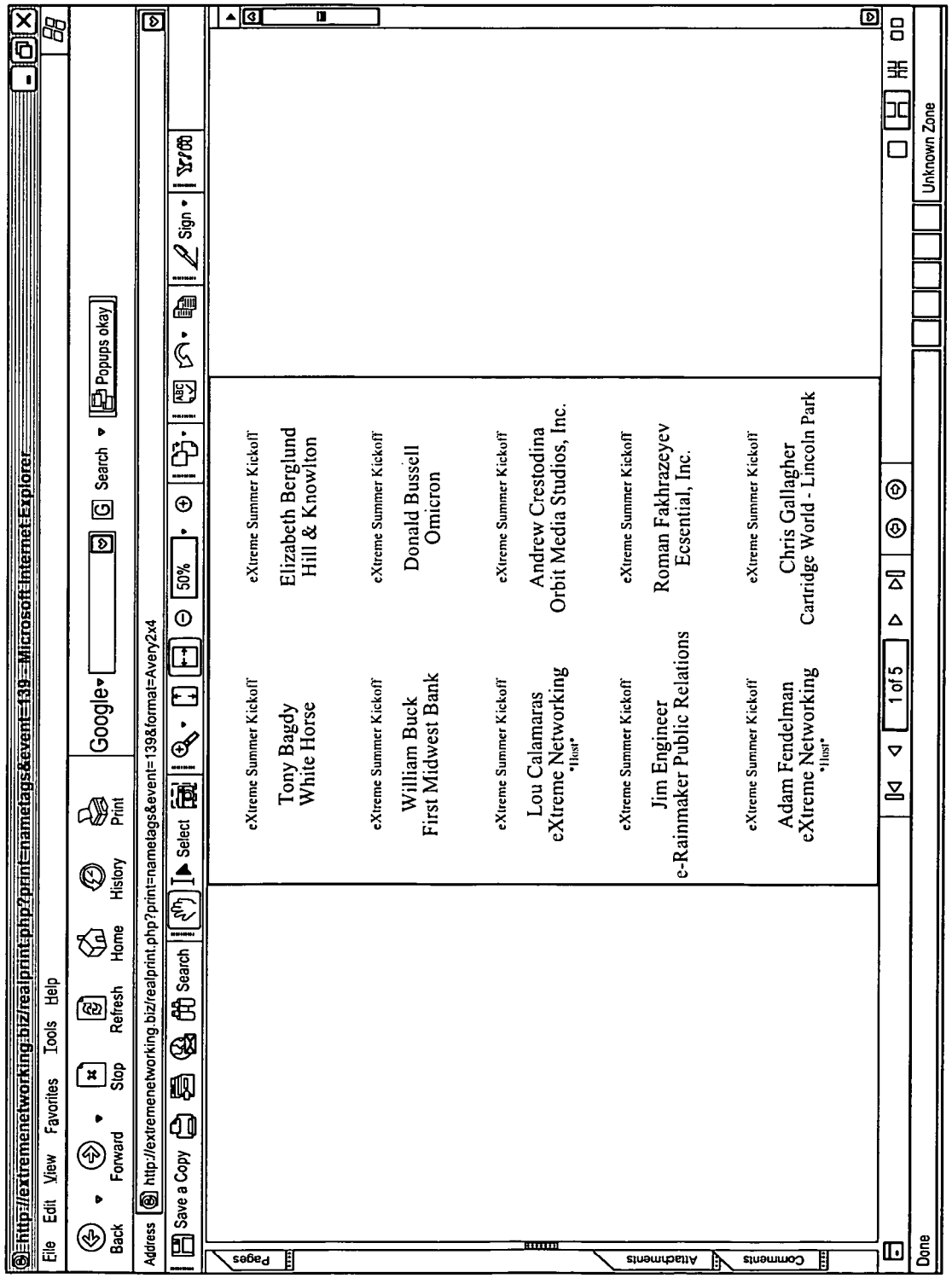
Figure 15:
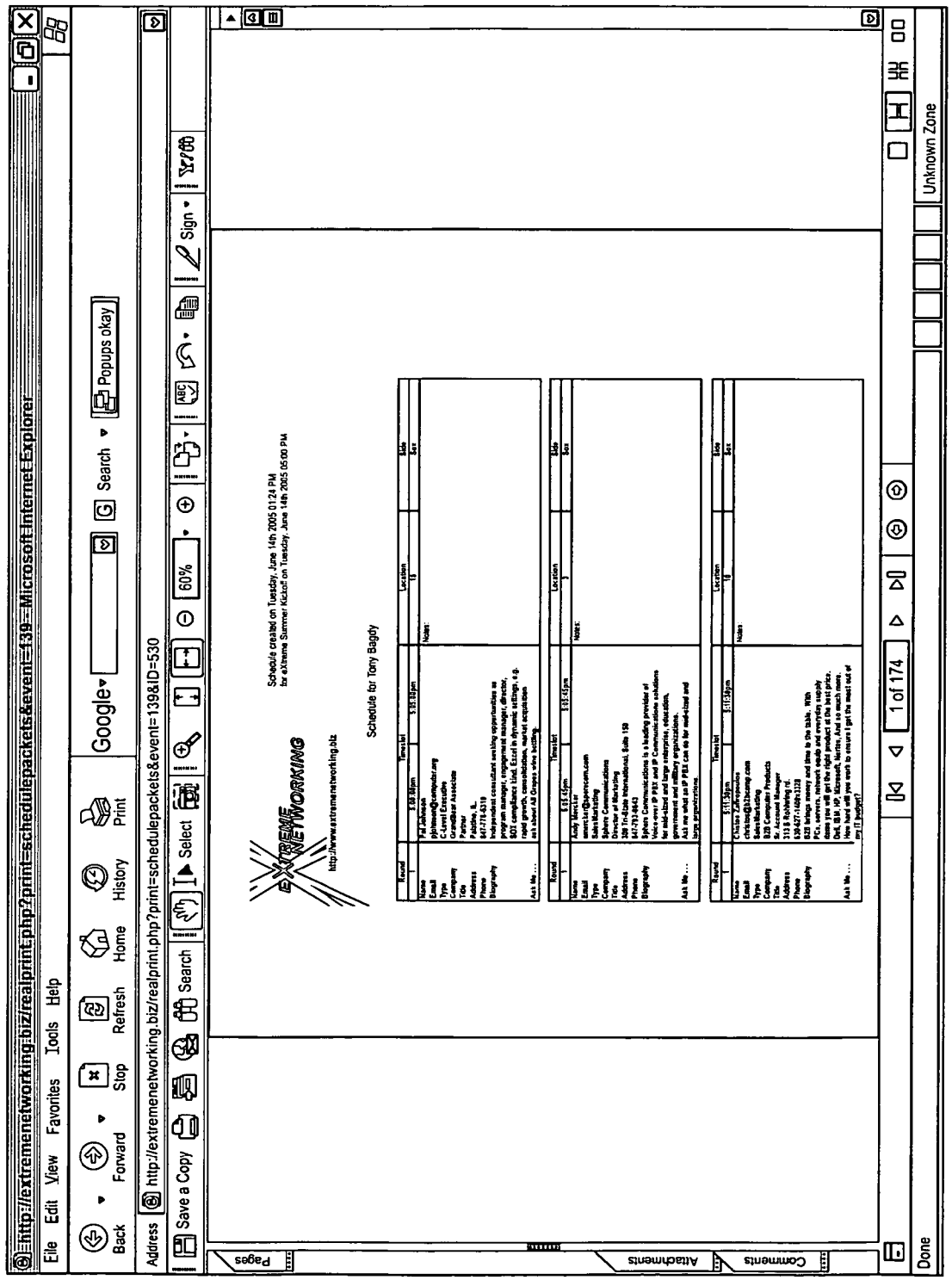
Figure 16:
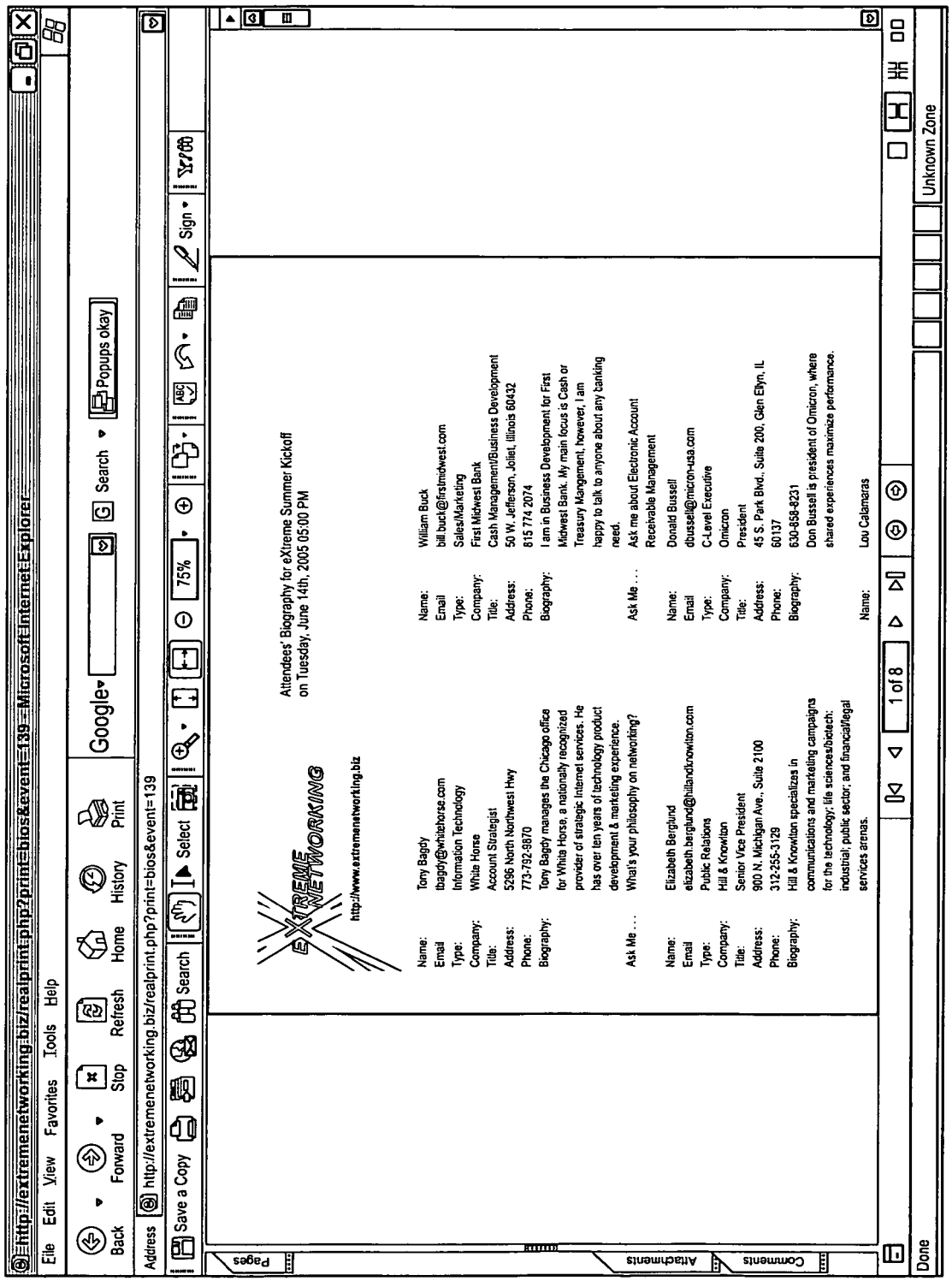
Figure 17:
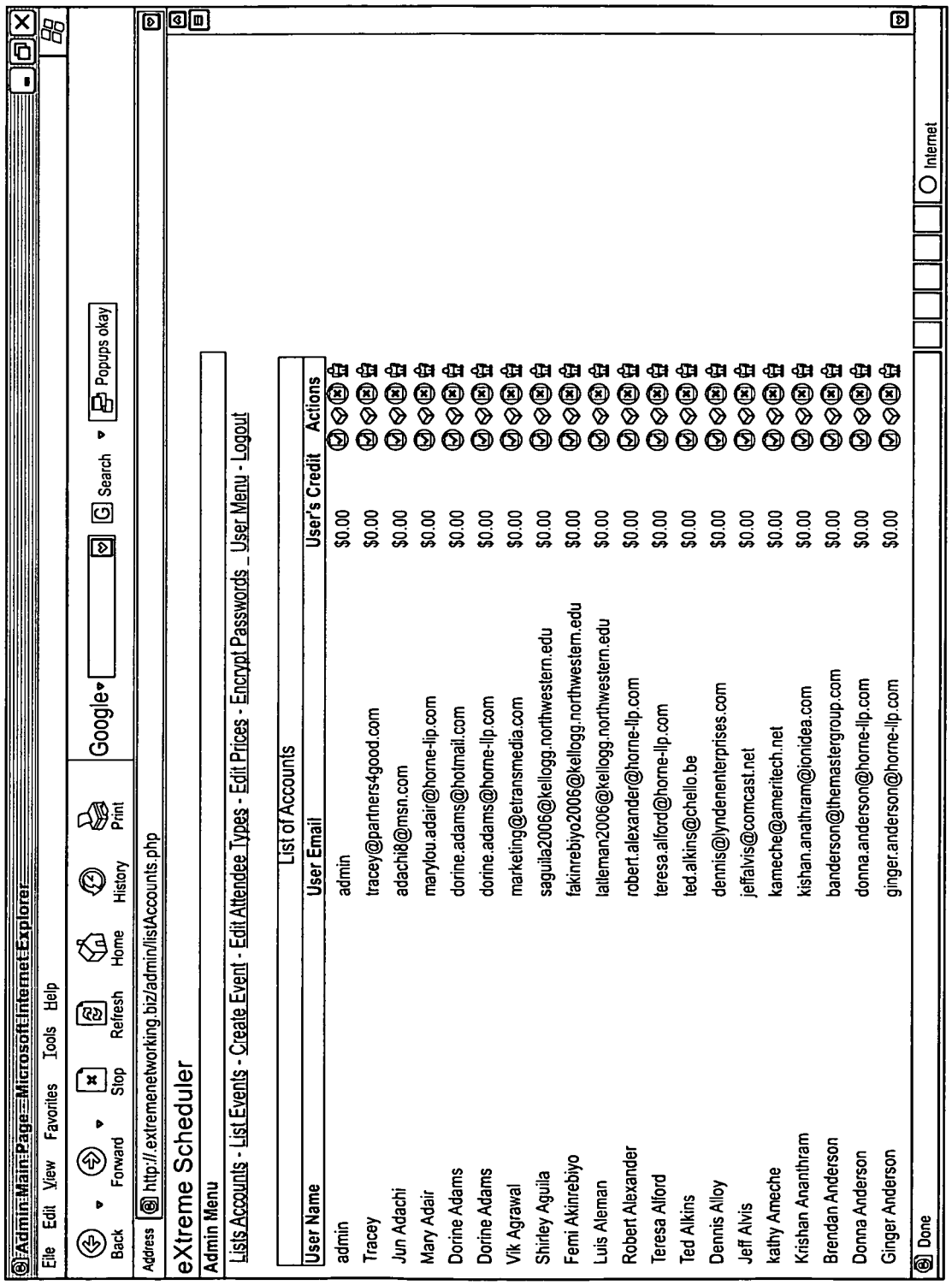
Figure 18:
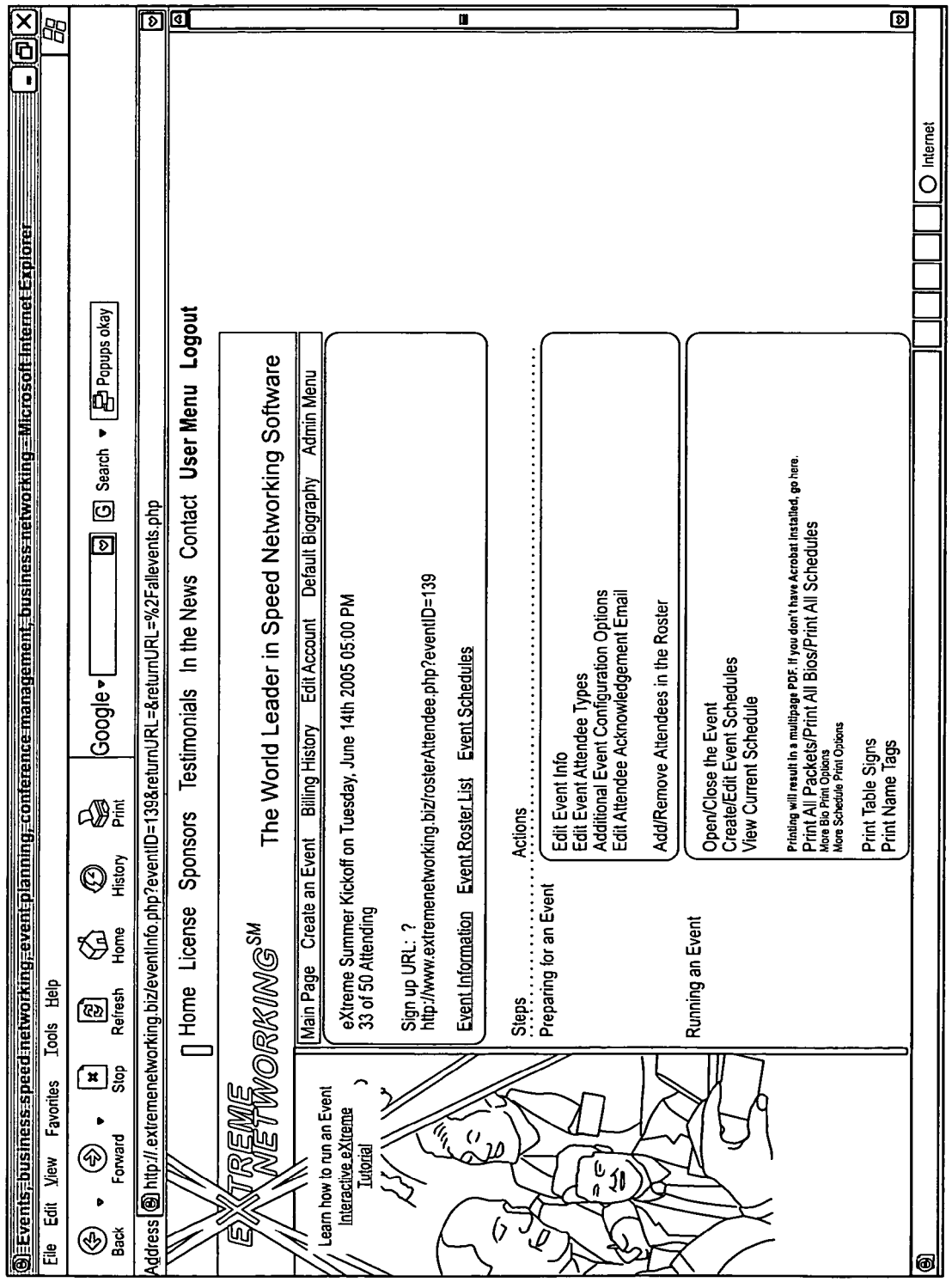
Figure 19:
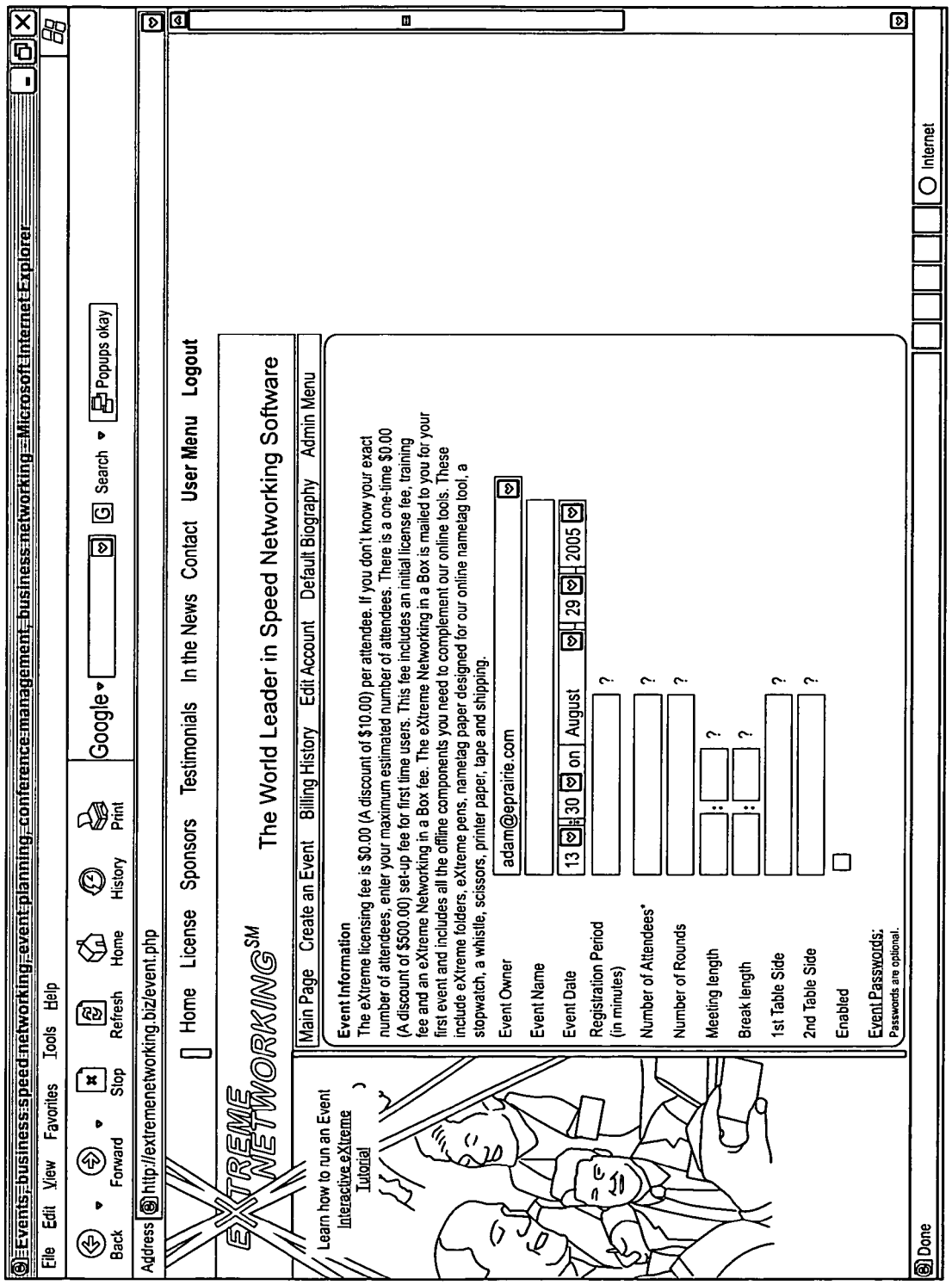
Figure 20:
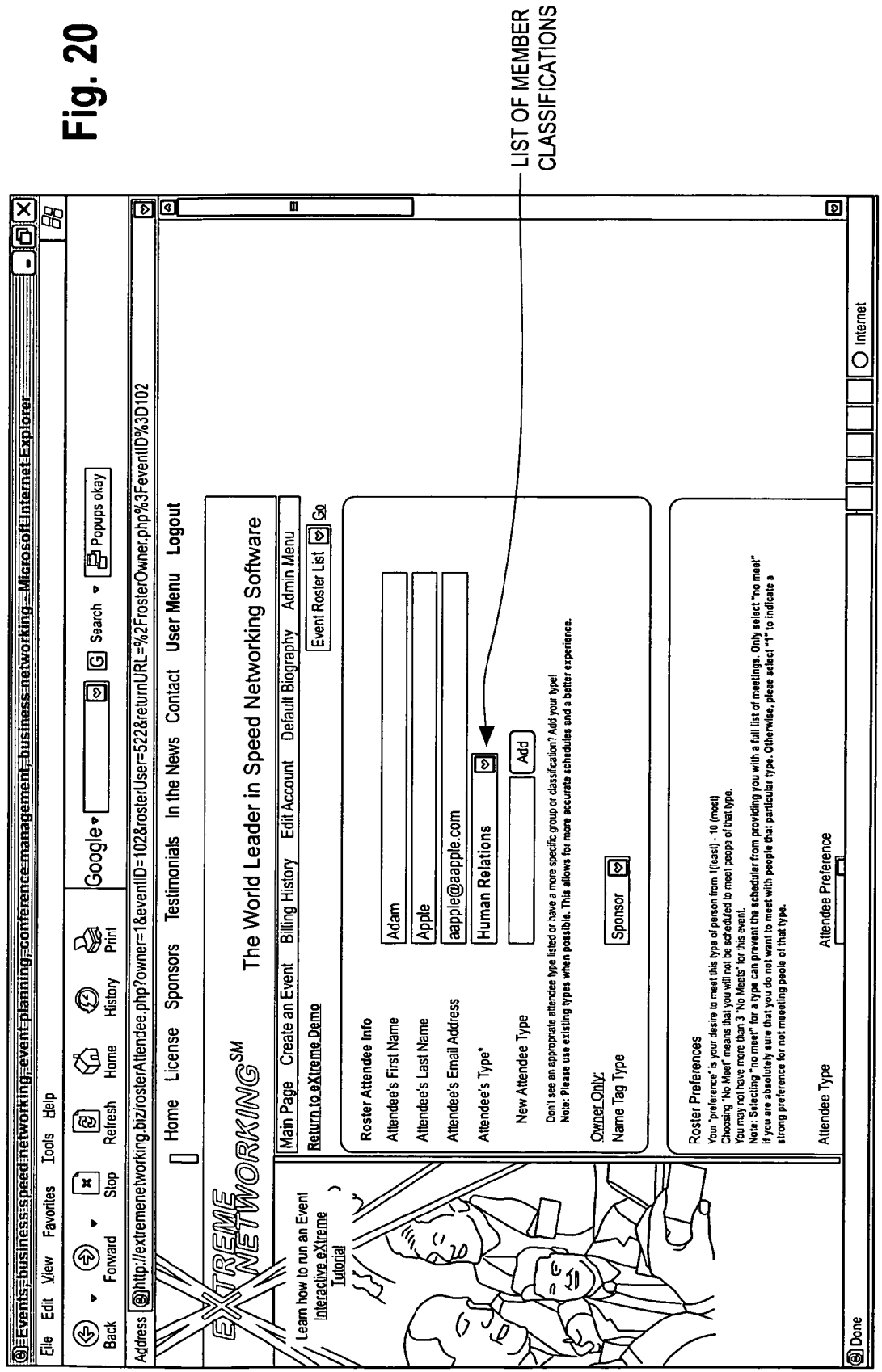
Figure 21:
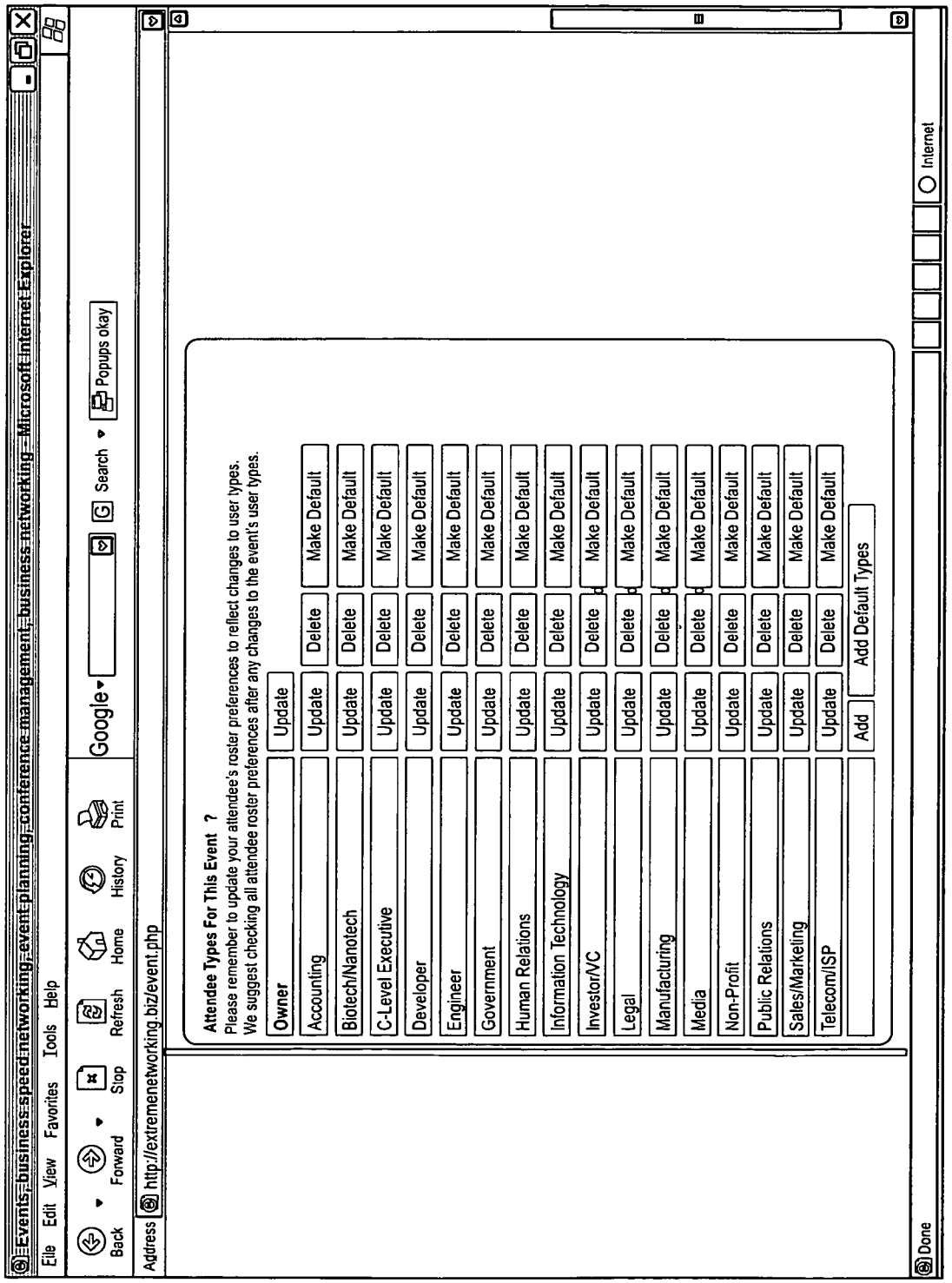
Figure 22:
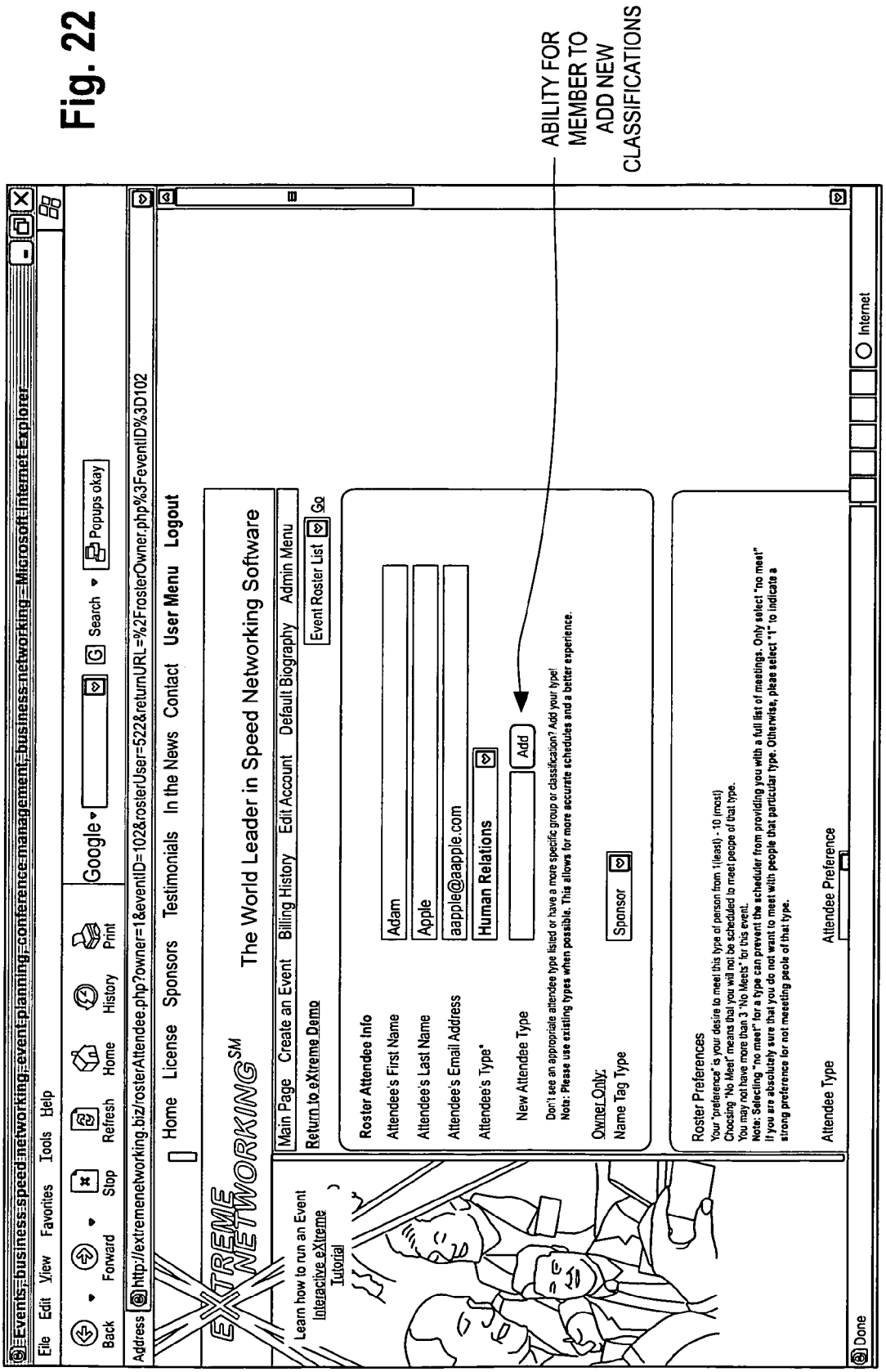
Figure 23:
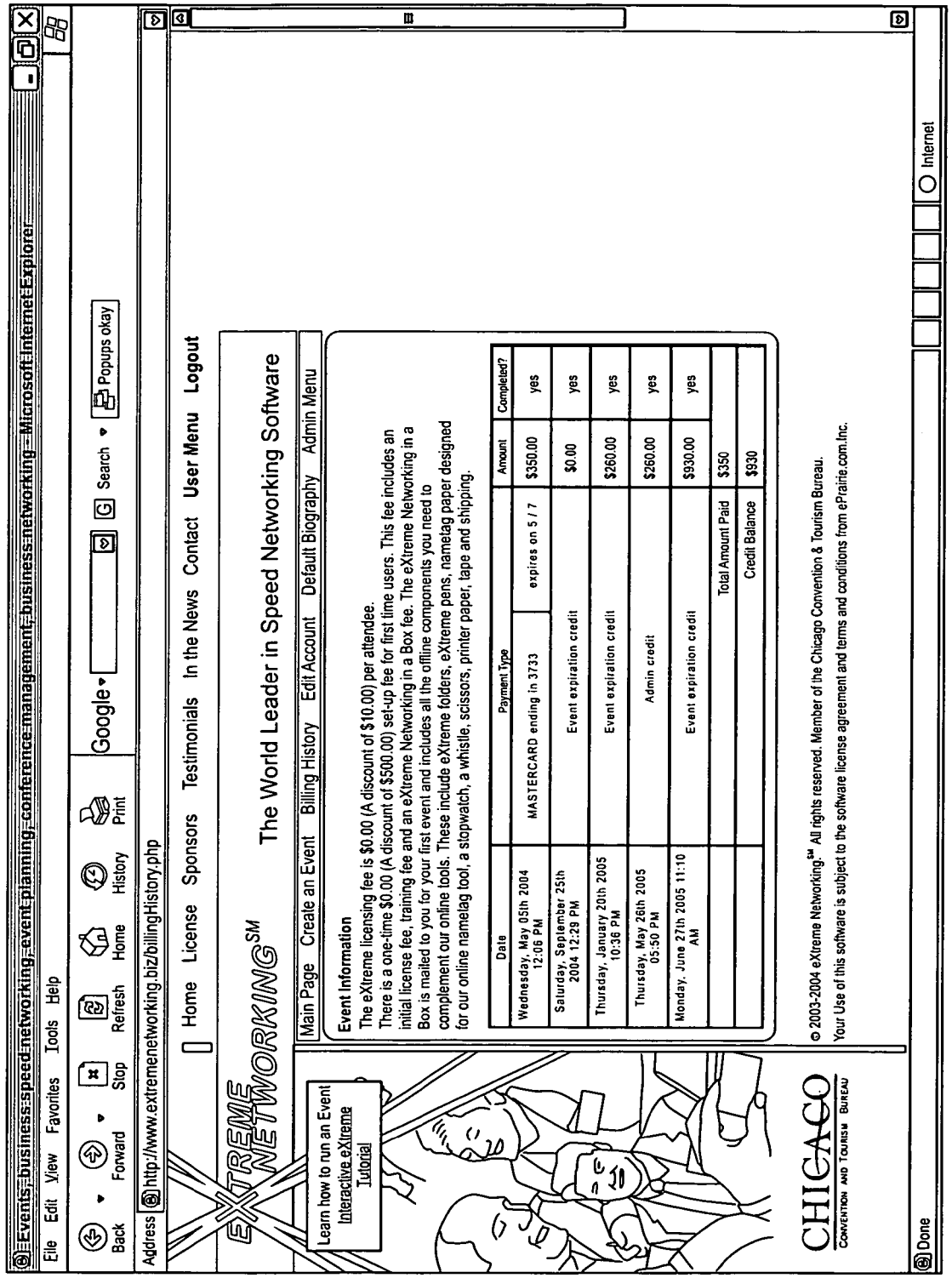
Figure 24:
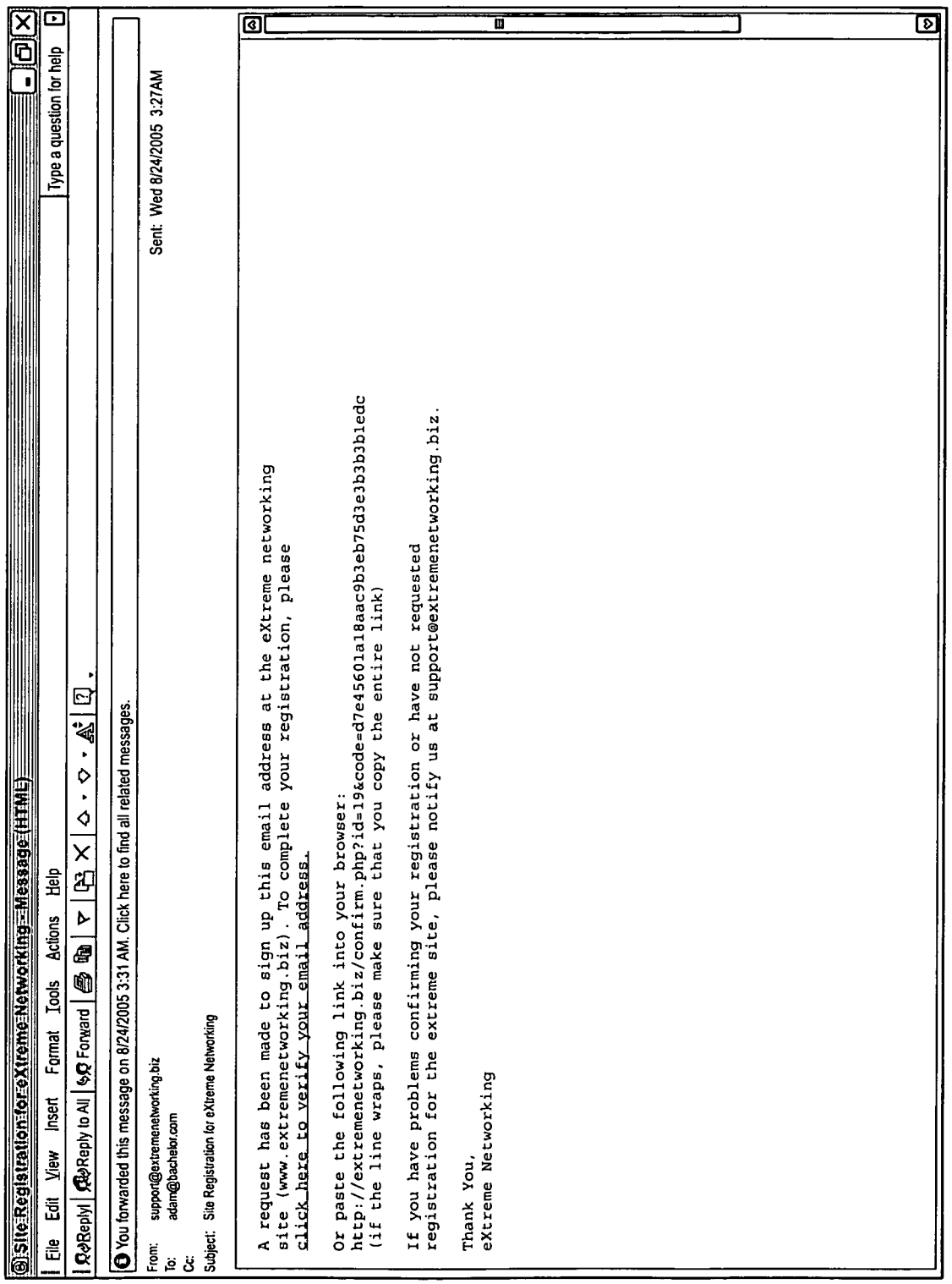
Figure 25:
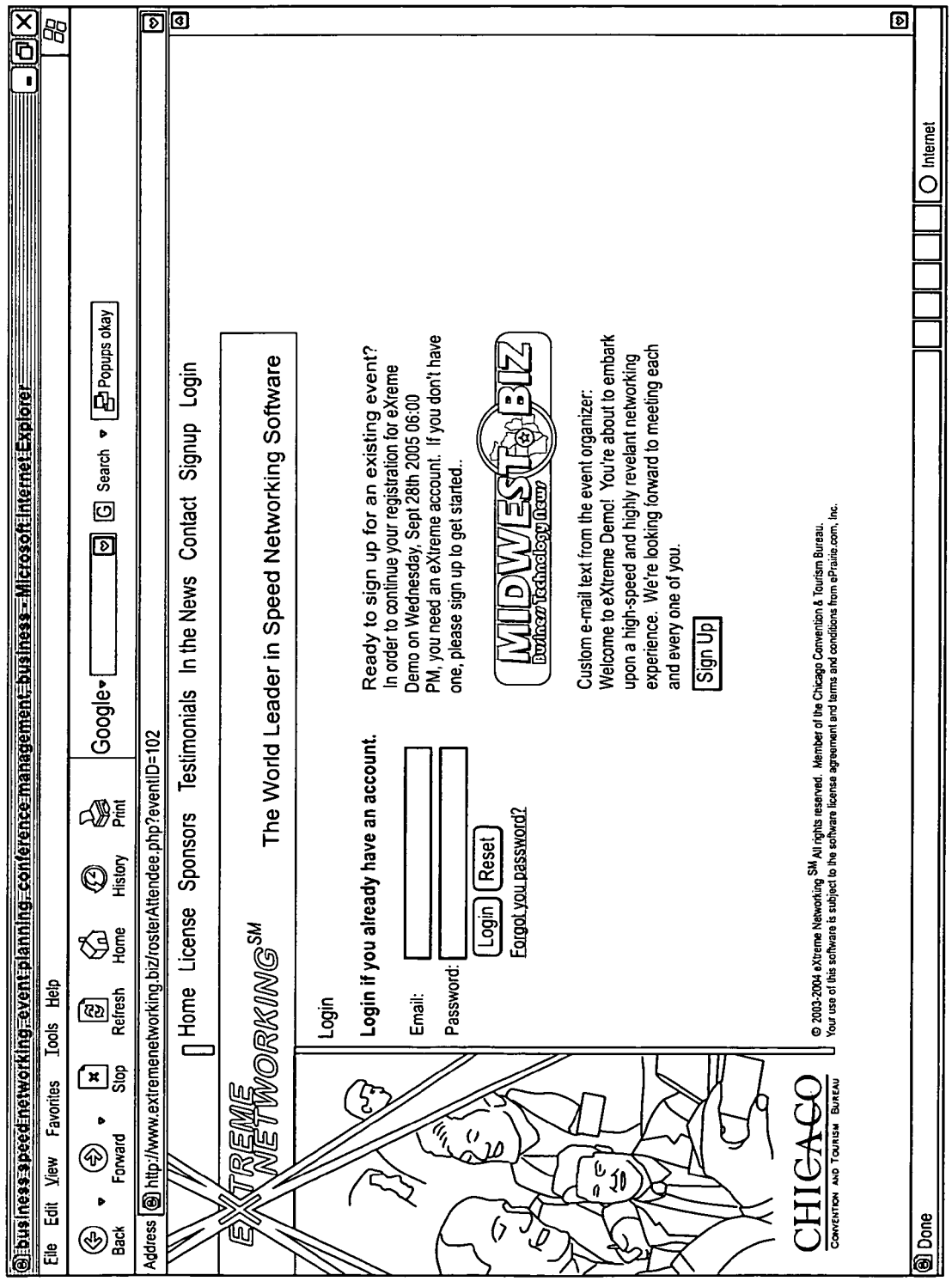
Figure 26:
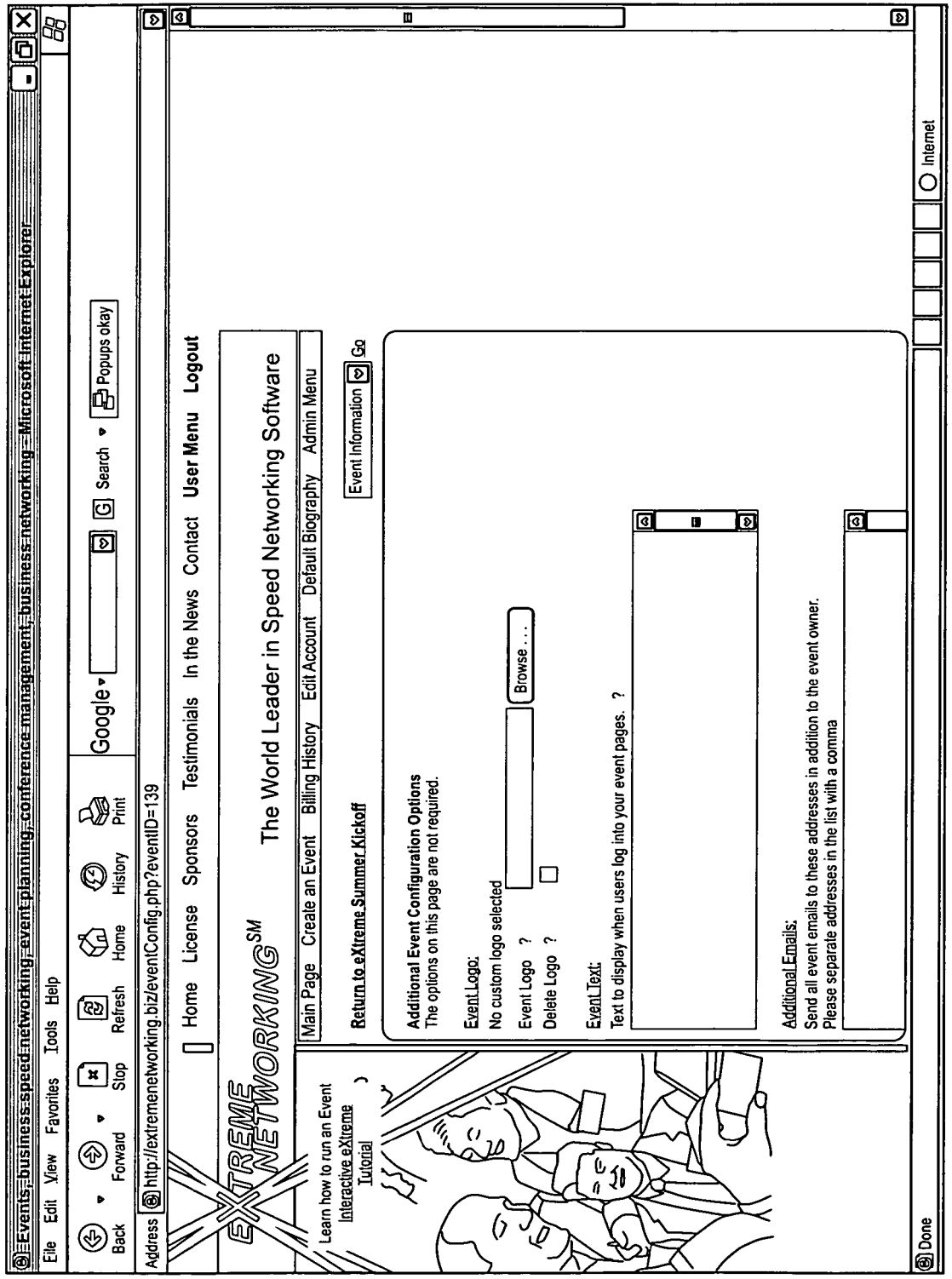
Figure 27:
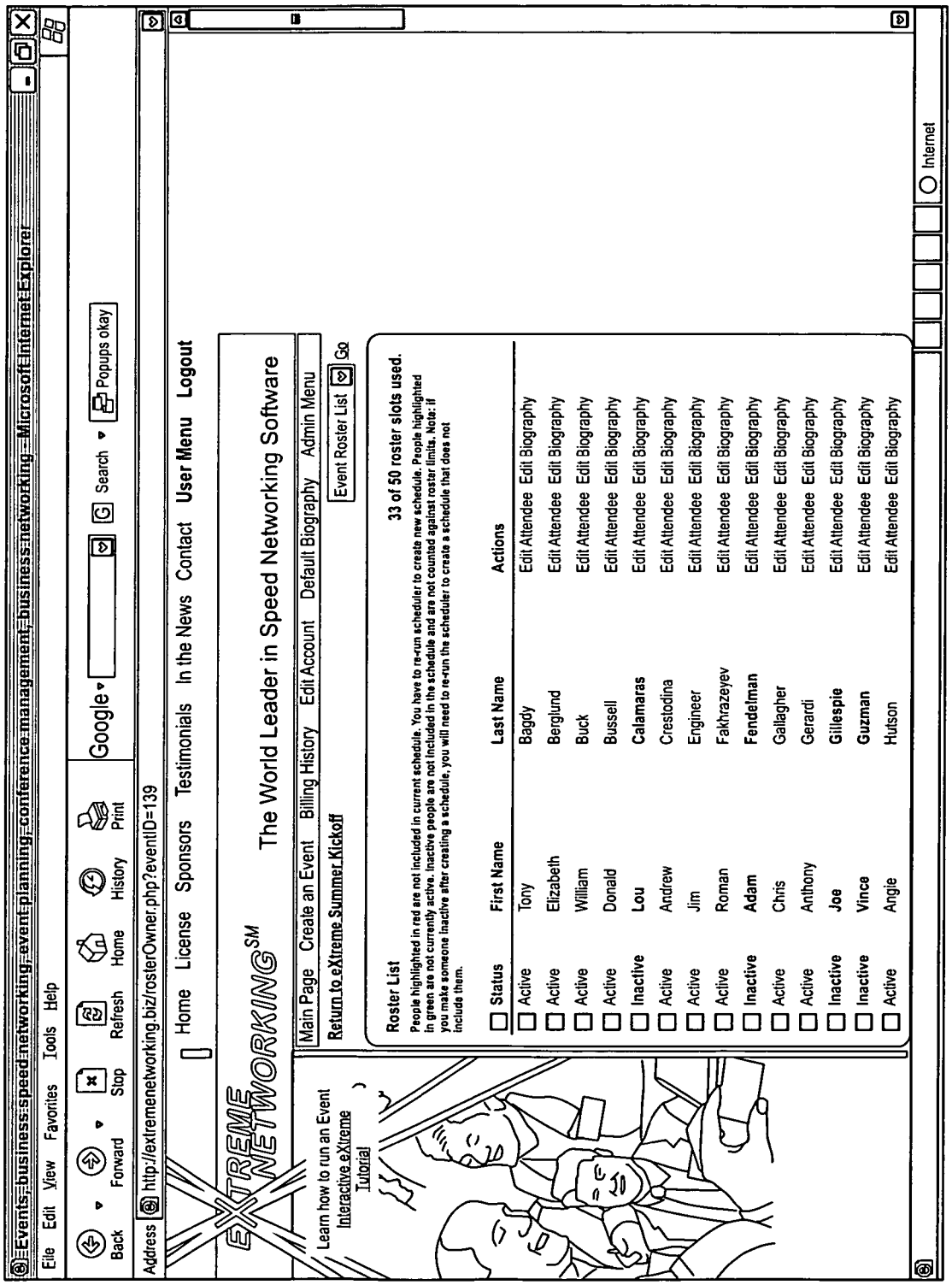
Figure 29:
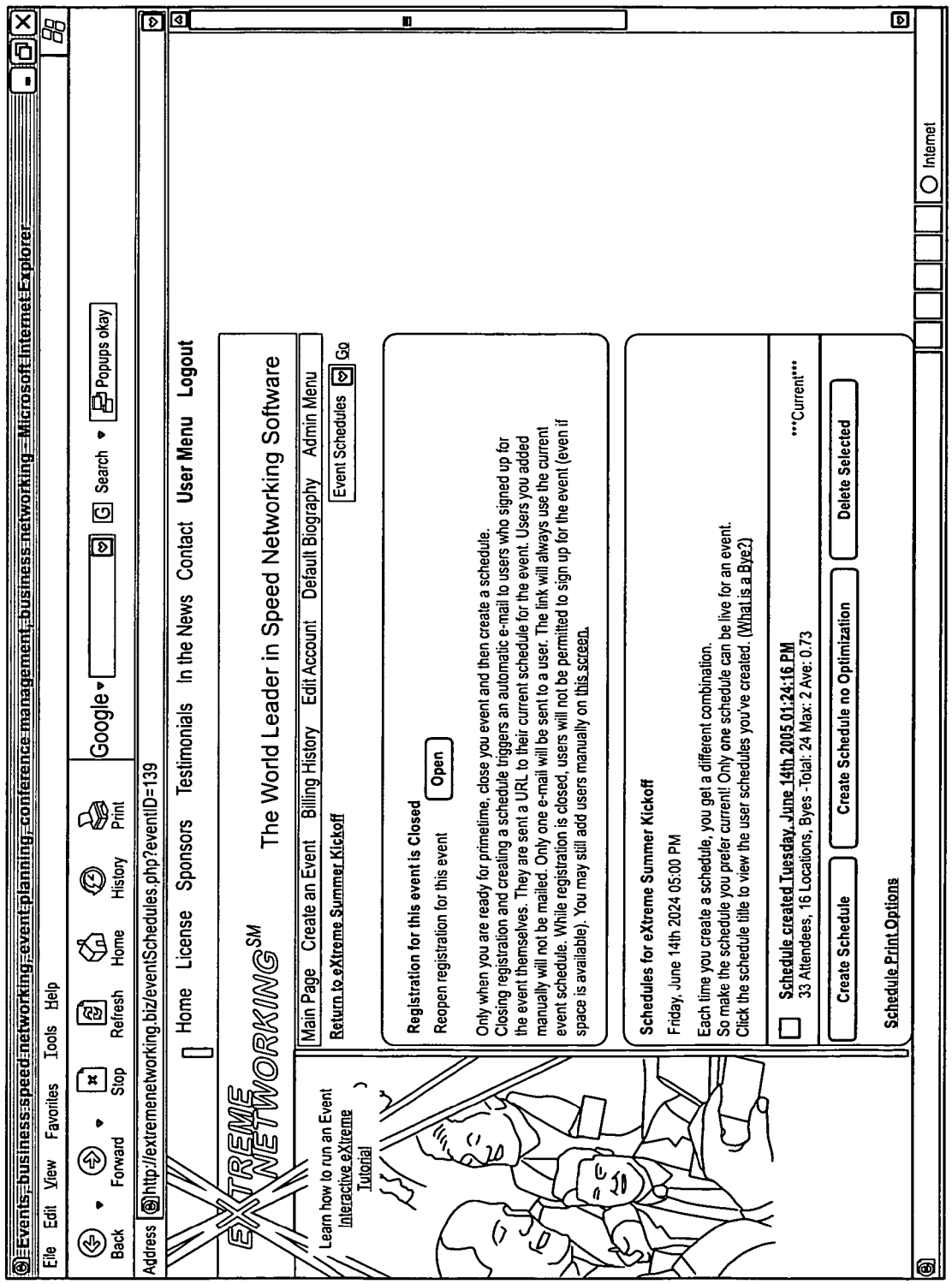
Figure 31:
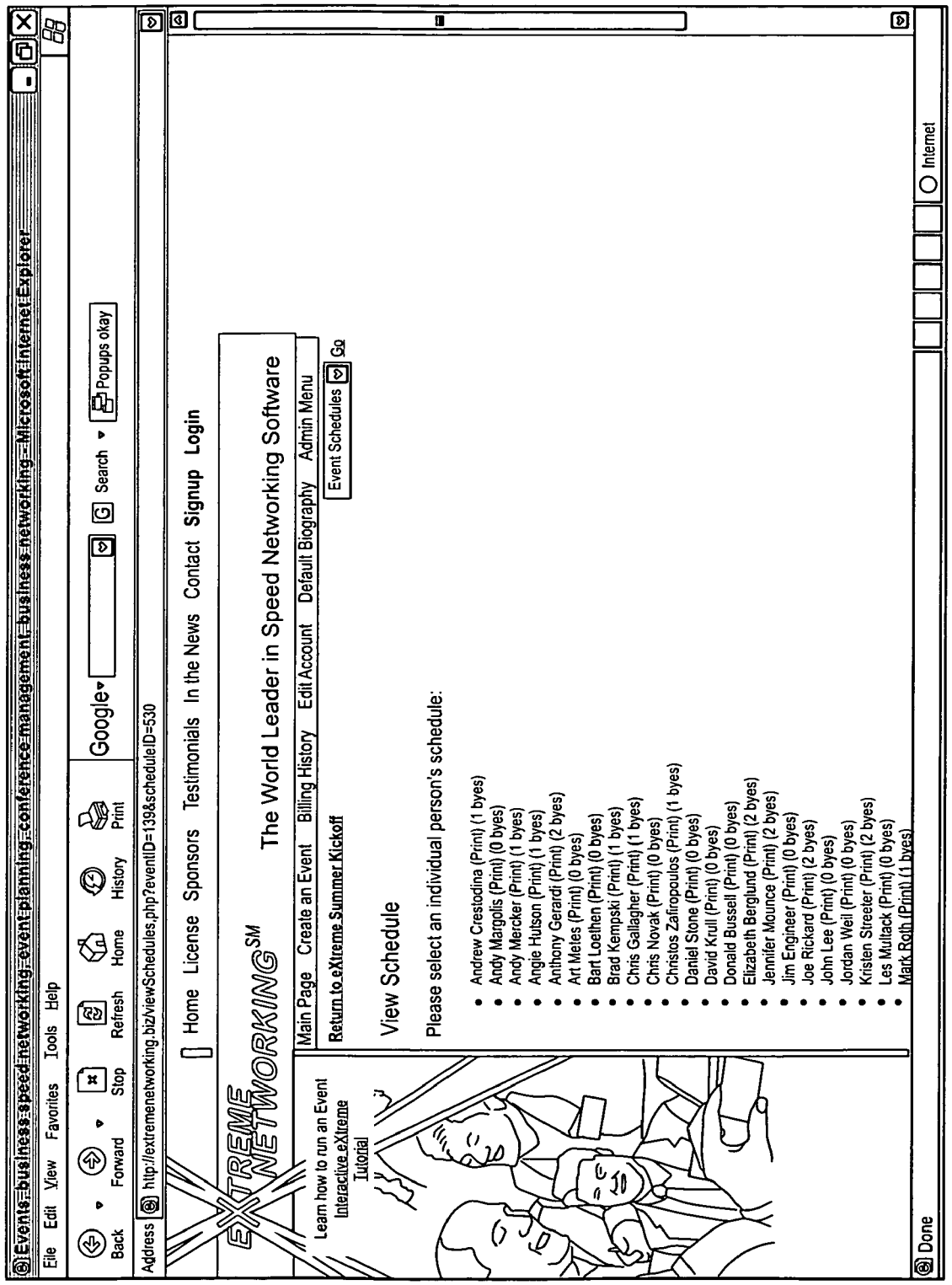

FIG. 1 is a flow chart illustrative of an embodiment.
FIG. 2 is a flow chart illustrative of an embodiment.
FIG. 3 is a flow chart illustrative of an embodiment.
FIG. 4 is a flow chart illustrative of an embodiment.
FIG. 5 is a flow chart illustrative of an embodiment.
FIG. 6 is a flow chart illustrative of an embodiment.
FIG. 7 is a flow chart illustrative of an embodiment.
FIG. 8 is a flow chart illustrative of an embodiment.
FIG. 9 is a screen shot illustrative of an embodiment.
FIG. 10 is a screen shot illustrative of an embodiment.
FIG. 11 is a screen shot illustrative of an embodiment.
FIG. 12 is a screen shot illustrative of an embodiment.
FIG. 13 is a screen shot illustrative of an embodiment.
FIG. 14 is a screen shot illustrative of an embodiment.
FIG. 15 is a screen shot illustrative of an embodiment.
FIG. 16 is a screen shot illustrative of an embodiment.
FIG. 17 is a screen shot illustrative of an embodiment.
FIG. 18 is a screen shot illustrative of an embodiment.
FIG. 19 is a screen shot illustrative of an embodiment.
FIG. 20 is a screen shot illustrative of an embodiment.
FIG. 21 is a screen shot illustrative of an embodiment.
FIG. 22 is a screen shot illustrative of an embodiment.
FIG. 23 is a screen shot illustrative of an embodiment.
FIG. 24 is a screen shot illustrative of an embodiment.
FIG. 25 is a screen shot illustrative of an embodiment.
FIG. 26 is a screen shot illustrative of an embodiment.
FIG. 27 is a screen shot illustrative of an embodiment.
FIG. 28 is a screen shot illustrative of an embodiment.
FIG. 29 is a screen shot illustrative of an embodiment.
FIG. 30 is a screen shot illustrative of an embodiment.
FIG. 31 is a screen shot illustrative of an embodiment.

V. EMBODIMENTS

The accompanying drawings illustrate embodiments intended to illustrate and exemplify in a teaching manner.

As used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality. Encompassed is various input and output devices suitable for enabling the cooperation of the system as a whole. Logic flow can represent signal processing, such as digital data processing, communication, or as evident from the context hereinafter. Logic flow or "logic means" can be implemented in discrete circuits, programmed computer, or the equivalent. Computer-readable media, as used herein can comprise at least one of a RAM, a ROM, A disk, an ASIC, and a PROM. Industrial or technical applicability is clear from the description, and is also indicated below.

By way of the following prophetic teaching, there can be computer support, as in a data processing system, for implementing handling of encounters, physical or otherwise. Encounters, such as for networking, could have been considered as something of a challenge: to encounter who one wants to encounter and to avoid who one wants to avoid encountering, preferably in an efficient manner. The embodiments herein can roughly be considered as a means for addressing or partially addressing such a challenge. For example, in one embodiment, there can be a tool that schedules and/or configures encounters (physical meetings or other encounters). One type of the embodiments represents a standalone system, and another type represents a Web-based system, though such embodiments are representative of all manner of handling encounters.

Thus for example, an embodiment can be used for breakout sessions at trade shows and conferences, or in another embodiment, for virtual meetings over the Internet or telephone. In one implementation can be a Web-based scheduling interface suitable for allowing event organizers to determine in advance individual meetings among their attendees. Another embodiment enables organizers to program who meets who and who does not meet, and if desired, the meetings can be optimized for criteria such as minimizing movement among those who are meeting. Another embodiment permits programming the desired length of each meeting as well as how many meetings occur throughout the course of an event.

For an illustration, consider FIG. 1, which can have at least one Internet server (4), such as that manufactured by Dell, Sun, etc, which enables the distribution and exhibition of a Web site (8) on a public Internet (6) (i.e., "the Internet"). The Web site (8) can show a page such as the screen shot in FIG. 9, which can be accessed by an event owner's computer (12), an administrator's computer (10), a prospective owner's computer (22), a member's computer (14), and a sales agent's computer (20), among other computers.

The owner's computer (12) is accessed by the event owner (13) who logs into the Web site (8). The event owner (13) is able to send an e-mail with a list of member e-mail addresses (36), such as the screen shot in FIG. 10. The e-mail addresses (36) can be obtained from the Web site (8). The event owner's computer (12) is connected to an event owner's printer (24), which prints information used by an owner (12) and a number of members (14).

The printed information includes a printed registration list (42), a printed attendee preference report (40) such as the screen shot in FIG. 11, which details a calculation of classifications at an event of meetings chosen by members, printed table signs (30) such as the screen shot in FIG. 12, which instruct members to meet other members at an event of meetings by specifying a station number (90) and table side (78), a printed schedule of meetings (26) such as the screen shot in FIG. 13, which lists a round number (29), meeting time (31), station number (90), table side (78), member name (16) and classification (52) to pair each member (16) with other members (18), printed nametags (32) such as the screen shot in FIG. 14, which format a name of an event of meetings (44) and member information (16) into a printout on nametag paper, printed packets (28) such as the screen shot in FIG. 15, which lists a round number (29), meeting time (31), station number (90), table side (78), member data set (54) and blank space for taking meeting notes (33) to pair each member (16) with other members (18) and printed member personal information (34) such as the screen shot in FIG. 16. With regard to format mentioned herein, a standard format such as that for Avery can be used.

The event owner (13) distributes printed schedules of meetings (26), printed nametags (32), printed packets (28) and printed member personal information (34) to members (14). The printed schedules of meetings (26) are used by the members (14) to determine what other members (18) they will be meeting, at which station number (90) members will meet other members and on which side (78) and what time (31) members will meet other members (18). The printed nametags (32) can be worn by members (16) to show other members (18) and event owners (13) their name. The printed packets (28) and printed personal information (34) can be used by members (14) to learn names and information about other members (18) they will be meeting.

Turn now to FIG. 2 for further exemplification. The Internet server (4) enables the distribution and exhibition of the Web site (8) on the public Internet (6). On the Web site (8), individuals including members (16), owners (13) and administrators (155), can logon to an administrator page (154) such as the screen shot in FIG. 17. Individuals can also logon to an administrator page (154) using an administrator user impersonation tool (156) that permits an administrator to log in as a user without entering the user's password, for example, in response to a user request for customer support. An event template (49) such as the screen shot in FIG. 18 can also be logged onto from the Web site (8). Also found within the Web site is the ability to insert member photographs (204) into a member packet (28 and 82) and an ability to generate a report of additional owner questions (208).

The server (4) hosts the algorithm (2) and allows for the creation of a database for all data (190). The server also hosts and allows for the creation of a backup database (192) and allows for the ability of event owners (13) to restore data from the database (194) and the ability to encrypt member passwords (196) in the database so as to convert a human readable password into a secure password comprised of numbers, letters and characters.

The Web site (8) can allow for the ability for event owners (13) to import the information to allow for registration on an owner's independent Web site (206). Hosted within the server (4) is the ability to alter the Web site (8) to provide Web search prioritization (200). Search prioritization (200) is the configuring of a Web site to allow for higher rankings on popular search engines.

Turn now to FIG. 3 for further exemplification. The algorithm (2) is hosted on the server (4). The algorithm (2) is configured to compute events of meetings (44), which are made up of multiple individual meetings (46). Events of meetings (44) are determined by event parameters (48) such as the screen shot in FIG. 19, which includes an event owner e-mail address (13), a name of the event of meetings (44), an event time/date (66), the length of a registration period (68) before an event of meetings (44), number of meeting rounds (72) in an event of meetings (44), meeting length (74), time between meetings (76), table sides (78) and classifications (52). Additional questions from an owner (53) can be added from an additional configuration options page (51). Event parameters (48) are entered into an event template (49). The output generated from the algorithm (2), which is computed from the data in the event parameters (48), includes rankings of classifications (58), schedules of meetings (60) and printed schedules of meetings (26).

The data computed within the algorithm (2), which is used to output rankings of classifications (58), schedules of meetings (60) and printed schedules of meetings (26), can be provided by members (14) and owners (13) and can include member classifications (52) such as the screen shot in FIG. 20, which are classifications chosen by a member for a member, member meeting classifications (56), which are classifications chosen by members (16) for other members (18), a member data set (54), which includes a member classification (52), a list of member meeting classifications (56), ability to select user exclusions (55) to prevent members (16) from meeting other members (18) when requested, and member default classifications (50) such as the screen shot in FIG. 21. Member classifications (56) allow for an ability of members (16) to add their own classifications (120) such as the screen shot in FIG. 22 an ability for an administrator (155) to override member classifications (180) and an ability to update added classifications in real-time (122) for all members.

The schedule computation can be carried out in one of any suitable algorithms. Again, as a teaching example, consider computation of the algorithm (2) performed as follows: To compute a schedule of meetings (60), and for example, four data points can be used: a list of member classifications (52) defined for the event being scheduled, a list of members (16) to be scheduled, the number of meeting rounds (72) of meetings (46) that the schedule of meetings (60) will encompass, and a list of Web site personal information (86).

A member data set (54), which in this example contains four data points, though there is no intention of limiting the data set by way of this teaching example, and the data set could be any data set depending on the implementation desired. First, a member classification (52) for the event of meetings (44) being scheduled. Second, a numeric score for each member classification (52) in the type list indicating the member's (16) preference for meeting other member's (18) of the given classification (52). The higher the score, the more likely a member (16) will meet with people of that classification (52). Third, a list of other members (18) that the member (16) does not wish to meet. The algorithm (2) will never schedule meetings (46) between members (16) where one is excluded from meeting another member (18). Fourth, a list of member meeting classifications (56) that the member (16) does not wish to meet. The algorithm (2) will never schedule meetings (46) between members (16) where the classification (52) of one is excluded by another member (18).

The process of initializing data involves entering the classifications (52), the members (16) and the website personal information (86) into a SQL database (190). This allows the use of SQL database (190) queries to generate member data sets (54) filtered on various criteria, such as excluding members (16) already matched.

The process of normalizing data involves entering the classification (52) from a member (16), which is not directly comparable to the classification (52) for another member (18). For example, assume that member "A" enters a value of "3" for all classifications (52) and member "B" enters "10" for all classifications (52). Neither member (16) has expressed a desire for any particular classification (52) but the desires of member "B" will appear to be more important than the desires of member "A". To avoid this problem, we adjust the desires so that mean preference score is the same for all members (16) while keeping the differences between the numeric scores the same.

Specifically, the mean ("M") of the scores (?) is computed and each normalized score ("NS") is calculated from the corresponding raw score ("S") as such: NS=S+(5.5−M)

The normalized score is then multiplied by 100 and rounded to obtain an integer score used for the actual scheduling computations.

The meeting score for a meeting (46) is determined by finding the normalized preference score the member (16) assigned to the other member's (18) type, taking the normalized preference score the other member (18) assigned his member classification (52) and creating a sum of the two scores.

If either member (16) has no scheduled meetings in the previous rounds (72), we adjust the meeting score by finding the aggregate number of no meetings (byes) for the first member (16), finding the number of no meetings for the other member (18), taking the greater of the two, dividing this number by the number of meeting rounds (72) scheduled (including this meeting round (72), multiplying this number by 2,000 and adding to the meeting score generated above.

This prevents any one member (16) from being scheduled with too many no meetings by increasing the importance of all of their meetings (46) in the selection process in the later rounds.

The scheduling procedure used to create a schedule of meetings (60) occurs according to three steps. For each meeting round (72), a list of all potential meetings is generated (e.g., in the descending order of score). Meetings (46) that have the same score are listed in a random order. Second, for each meeting (46) from the list, a determination is made as to whether the meeting (46) is valid. Third, if the meeting is valid, the match score is recorded in the schedule database (190).

A meeting (46) can be valid unless, for example, one member (16) is on the other member's (18) exclude list, one member's (16) type is on the other member's (18) type exclude list, the two attendees have met in previous meetings rounds (72) or either member (16) has been previously scheduled for the current meeting round (72).

Each meeting (46) is assigned to a station number (90), and each member (16) to a table side (78). For each meeting round (72), there can (depending on the implementation) be three rules that are followed. First, a schedule is generated of the meetings (60) according to the default order of the database (190), and the station is assigned to each meeting in that order. Second, for each member (16), there is assigned to another such member (16) with the lower internal numeric ID goes to the first table side (78). This ensures that each meeting (46) has a unique station number (90) within the range of available station numbers (90) and that each member (16) has a unique table side (78).

Other algorithmic methods to compute schedules (60) can of course be used, and the foregoing is merely representative. For example, another embodiment could include iterating over all possible combinations of meetings (46), such that nobody appears in more than one meeting (46) for a given combination, and selecting the one meeting (46) with the maximum score.

Another algorithmic method can involve eliminating the meetings (46) with the lowest rankings of classifications (58) rather than selecting meetings (46) with the highest rankings of classifications (58) with the caveat that you cannot remove a meeting (46) that would result in a no meeting unless there are no other options Turn now to FIG. 4 for further exemplification. The event parameters (48) include a number of members in an event (70), a number of meeting rounds (72), the registration period for the event (68), an event date and time (66), an event name (44), a time for suspending meetings (80), an event owner (13) identified by an owner e-mail address (62), names of table sides (78), time between meetings (76) and an event length (74).

The event parameters (48) can be entered by event owners (13), members (14) or administrators (155) into an event template (49) found within the Web site (8). Once entered into the Web site (8), the algorithm (2) computes the data and generates online and printable output, which can include rankings of classifications (58), schedules of meetings (60) and printed schedules of meetings (26) as described in the description for FIG. 2.

Turn now to FIG. 5 for further exemplification. The event template (49) is found within the Web site (8) and can allow owners (13), members (14) or administrators (155) to enter and manipulate event parameters (48) and registration elements associated with an event or events (44).

Found within the event template (49) is an ability to display mouse-over tool tips (156), which instructs members (16) on how to enter their member data set (54), an ability for an administrator (155) to set default pricing (174) across a Web site, an ability to import a member data set (54) from an owner's Web site (212), an ability to include a list of prior billing activity (170) such as the screen shot in FIG. 23 from an event owner (13), an ability of an event owner (13) to upload logos (184), an ability for members (16) to cancel registration (158), an ability to send member verification e-mails to register for an event (188) such as the screen shot in FIG. 24, an ability for an administrator (155) to receive payment from an owner (160), an ability to credit an event owner (13) for unused event members (164), an ability for an administrator (155) to set pricing for partners (178), an ability for administrators (155) to create partner URLs to offer discounts (166), ability to allow owners (13) to access past event information (172) and an ability for event owners (13) to import customized text on a registration page (182) such as the screen shot in FIG. 25.

Turn now to FIG. 6 for further exemplification. The event template (49) is found within the Web site (8) and can allow owners (13), members (14) or administrators (155) to enter and manipulate event parameters (48) and registration elements associated with an event or events (44).

Found within the event template (49) is a Web site registration list (106), an individual Web site schedule (84), Web site personal information (86), Web site packets (82) and the ability for an event owner (13) to add additional event owner e-mail addresses (132) such as the screen shot in FIG. 26 in order to receive member event notifications.

Once Web site personal information (86) is created, the Web site (8) allows for the creation of Web site name tags (100) and member personal information printout (34) transmitted through an owner printer (24).

The event template (49) allows for an ability to review rosters online (136), an ability to deactivate members on a roster list (138) such as the screen shot in FIG. 27 and an ability to reactivate members on a roster list (140). Within user exclusions (55) is the creation of a roster in real-time (124).

Turn now to FIG. 7 for further exemplification. A printed schedule of meetings (26) can be used by members (16) and other members (18) to determine the time and location (66) of a meeting (46), station number (90) and table side (78) within an event of meetings (44). The printed schedule of meetings (26) is generated from the Web site (8), which is hosted along with the algorithm (2) on the server (4). To configure the printed schedule of meetings (26), the Web site (8) generates Web site personal information (86), individual Web site schedules (84) such as the screen shot in FIG. 28 and e-mails to members (102).

A printed schedule of meetings (26) lists all the meetings at an event of meetings (44). The event of meetings are hosted within a venue (92) and include a number of meeting station numbers (90), which each have a number of table sides (88). A table sign (30) at each station (90) can include a station table side (88) and the name of the event of meetings (44).

The printed schedule of meetings (26) allows for virtual meetings (94), which can be conducted via Internet virtual meetings (98) or telephone virtual meetings (96).

Turn now to FIG. 8 for further exemplification. The algorithm (2) is the mathematical equation that computes the event parameters (48) to allow for the creation of an event of meetings (44) and the generated and printed output, which includes rankings of classifications (58), schedules of meetings (60) and printed schedules of meetings (26), which can be used to coordinate an event of meetings (44). The mathematical code and computer language can be found in the appendix filed herewith.

Formulas embedded within the algorithm (2) include the ability to generate an individual Web site schedule (84), which creates the printed schedule of meetings (26) that allows for the movement of members responsive (116) to the algorithm (2). Additional formulas embedded within the algorithm (2) include a formula to minimize movement (118), which assigns station numbers (90) within the shortest possible physical distance while still accommodating member classifications (52), an ability to predict the amount of time to calculate schedules (186) based on the amount of data processed, an automatic calculation of statistics showing byes for all members (150), such as the screen shot in FIG. 29 of all members, an ability to preclude meeting one member more than once (112) in a meeting, an ability to preclude one member meeting more than one member (114) in a meeting, an ability to limit the amount of member optimizations (148), such as the screen shot in FIG. 30, based upon the amount of member classifications (52) in the event of meetings (44), an ability to create Web site group schedules for an event (142), an ability to override created schedules with a new schedule (144), an ability to error check and prohibit member registration if errors exist (146) and an automatic calculation of statistics showing byes for each member (152), such as the screen shot in FIG. 31, in an event of meetings (44).

It should be clear from the foregoing that the embodiments herein can be implemented in many ways, and one can view any embodiment from the perspective of one component or another. In addition to corresponding methods of making and using, as well as necessary data intermediates and products produced in various embodiments, to understand permutations, consider an apparatus for controlling a system carrying out an implementation, e.g., as set out in the claims. The apparatus can include, for example, a computer enabled to receive parameters defining an event of meetings of a plurality of members, and to receive a data set for each of the members, the data set including: at least one classification characterizing the member, at least one classification for meeting other said members of the group, and if more than one classification for meeting is entered, a corresponding ranking of the classifications for meeting other said members, wherein the computer is also enabled to generate a schedule of the meetings for the members by using the classifications and the rankings; and wherein more than one data set includes a ranking. Alternatively, there can be a system including a computer and means for controlling the computer to enable entering into the computer parameters defining an event of meetings of a plurality of members; entering into the computer a data set for each of the members, the data set including: at least one classification characterizing the member, at least one classification for meeting other said members of the group, and if more than one classification for meeting is entered, a corresponding ranking of the classifications for meeting other said members; and generating, with the computer, a schedule of the meetings for the members by using the classifications and the rankings; and wherein more than one data set includes a ranking.

For this or any aspect indicated herein, there can be a computer-readable media tangibly embodying a program of instructions executable by a computer to perform the steps of: entering into the computer parameters defining an event of meetings of a plurality of members; entering into the computer a data set for each of the members, the data set including: at least one classification characterizing the member, at least one classification for meeting other said members of the group, and if more than one classification for meeting is entered, a corresponding ranking of the classifications for meeting other said members; and generating, with the computer, a schedule of the meetings for the members by using the classifications and the rankings; and wherein more than one data set includes a ranking. The media can comprise at least one of a RAM, a ROM, a disk, an ASIC, and a PROM. The media can be such as to operate in conjunction with a suitable computer system so as to carry out an embodiment indicated herein.

From a different perspective, in understanding the robust nature of the embodiments herein, consider an electronic transmission apparatus for handling communications to implement a part of an embodiment, e.g., an electronic transmission apparatus handling communications to implement a part of an embodiment, e.g., registration, becoming a user, payment, etc., as set out herein.

Still another perspective is that of an electronic receiver apparatus for handling communications to implement a part of an embodiment, e.g., an electronic receiver apparatus handling communications to implement a part of an embodiment, e.g., registration, becoming a user, payment, etc., as set out herein. A transmitting or receiving system (respectively or in combination, e.g., for two way communication that can be by way of a relay, in real time, fax or otherwise) can representatively comprise one or more programs controlling transmission or reception of any of the data, input or output indicated herein, e.g., between computer systems communicating over an Internet network.

In sum, appreciation is requested for the robust range of possibilities flowing from the core teaching herein. More broadly, however, the terms and expressions which have been employed herein are used as terms of teaching and not of limitation, and there is no intention, in the use of such terms and expressions, of excluding equivalents of the features shown and described, or portions thereof, it being recognized that various modifications are possible within the scope of the embodiments contemplated and suggested herein. Further, various embodiments are as described and suggested herein. Although the disclosure herein has been described with reference to specific embodiments, the disclosures are intended to be illustrative and are not intended to be limiting. Various modifications and applications may occur to those skilled in the art without departing from the true spirit and scope defined in the appended claims.

Thus, although only a few exemplary embodiments have been described in detail above, those skilled in the art will readily appreciate that many modifications are possible in the exemplary embodiments without materially departing from the novel teachings and advantages herein: Accordingly, all such modifications are intended to be included within the scope defined by claims. In the claims, means-plus-function claims are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

We claim:

1. A method of computing to produce meeting schedules corresponding to a trade show or conference event, the method comprising:

receiving into a computer parameters defining a trade show or conference event for a plurality of members, wherein the parameters comprise a date and time of the event, a length of time for member meetings, and one or more default classifications for members participating in the event;

receiving into the computer a data set for each of the members, the data set comprising:

at least one classification characterizing the member, wherein the at least one classification characterizing the member is either selected from a list of the one or more default classifications or input by the member, personal information comprising a name and other information of the member, at least one classification for meeting other members of the plurality of members, wherein the at least one classification for meeting other members is selected from a list that includes the default classifications and the member-input classifications, a preference score for each selected classification for meeting the other members, and an optional indicator of a desire not to meet at least one of: one other member, other members of a particular classification, and both; and generating by the computer, prior to the date and time of the event and using the classifications and the preference scores, output comprising:

an overall meeting schedule comprising a plurality of member meetings for each of the members participating in the event, the overall meeting schedule including each of the plurality of member meetings for each round of member meetings, the overall meeting schedule based on the length of time for member meetings, wherein no two members are scheduled to meet with one another more than once at the event, wherein first members are more likely to be scheduled to meet second members having a classification that received a high preference score from the first member, and wherein no member meetings are scheduled between first members that indicated a desire not to meet second members characterized by said optional indicator, and for each member participating in the event, an individual meeting schedule comprising each member meeting for said participating member, the time and location of said member meetings, and the other members that said participating member will meet.

2. The method of claim 1, wherein the parameters include at least one of an event owner, an email address of the event owner, a name of the event, a registration period for the event, a number of rounds for the meetings, a meeting length, a time between the meetings, a name of table sides for the meetings, and a time for suspending the meetings.

3. The method of claim 2, wherein the parameters include the number of members in the meetings, the number of rounds for the meetings, and the time between the meetings.

4. The method of claim 2, wherein the parameters include the event owner, the name of the event, and the number of rounds for the meetings.

5. The method of claim 1, further including providing a template interface at a web site, the template interface configured for carrying out said receiving the data set.

6. The method of claim 1, wherein the step of receiving the data set includes receiving the data at a web site controlled by an owner of the event.

7. The method of claim 1, wherein the output includes, for each said member, a meeting packet including the meeting schedule and the personal information.

8. The method of claim 1, wherein the output reflects that the meetings are in person.

9. The method of claim 1, wherein the output reflects that the meetings are virtual meetings.

10. The method of claim 9, wherein the virtual meetings are by telephone.

11. The method of claim 9, wherein the virtual meetings are by Internet real time communication.

12. The method of claim 1, wherein the output includes, for each of the members participating in the meetings, a name-tag comprising the name and some of the other information.

13. The method of claim 1, wherein the other information includes contact information, and further including the step of:

generating an electronic communication responsive to a member request or an event owner request, the communication including the contact information corresponding to each of the members scheduled for meeting the member making the member request.

14. The method of claim 13, wherein the electronic communication is an email.

15. The method of claim 13, wherein the computer comprises multiple computers with functionality separated to collectively cooperate.

16. The method of claim 1, further including the step of outputting a member registration list by date of registration.

17. The method of claim 1, further including the step of outputting data including a percent of the members who chose to meet other members by classification, and a percent of the members who chose not to meet by classification.

18. The method of claim 1, further including the step of outputting data as a table sign printout corresponding to a location for some of the meetings, the printout oriented so that when paper on which the sign is printed is folded in half, the sign includes the name of event, a table side, and a station number.

19. The method of claim 1, further including the step of outputting data as an e-mail list including all the members and their e-mail addresses, the email list being conveyed by email to an event organizer computer.

20. The method of claim 1, further including the step of generating, for each of the members, a list of most relevant matches but devoid of meeting times corresponding to the meeting locations.

21. The method of claim 1, further including the step of generating, for each of the members, a list of most relevant matches and corresponding meeting times and the meeting locations.

22. The method of claim 1, wherein said step of receiving the data set includes receiving a list of other members that the member does not wish to meet.

23. The method of claim 1, wherein said step of generating precludes one member meeting more than one other member at a time.

24. The method of claim 1, wherein at least one meeting schedule is generated, in part, responsive to movement of the members to different locations.

25. The method of claim 1, wherein said step of generating is carried out, in part, to minimize movement of at least one of the members.

26. The method of claim 1, wherein the step of receiving the data set includes receiving the classification provided by one of the members into a member-accessible field of a user interface.

27. The method of claim 1, further including the step of, upon a classification change, updating the classifications for all the members in real time.

28. The method of claim 1, further including the step of producing a roster of attendees corresponding to the members, in user exclusions, in real time, the roster including the names of the members and corresponding classifications.

29. The method of claim 28, further including the step of deactivating one of the members in the roster.

30. The method of claim 29, further including the step of reactivating the one of the members in the roster.

31. The method of claim 1, further including the step of automatically creating a unique URL for each event at which the meetings are scheduled to occur.

32. The method of claim 1, further including the step of automatically sending an e-mail to an event owner when each member registers for the event at which the meetings are scheduled to occur.

33. The method of claim 1, further including the step of automatically sending a confirmatory e-mail to one of the members upon creation of a corresponding member account created at the web site.

34. The method of claim 33, further including the step of automatically sending a confirmatory e-mail to the one of the members upon registration for the event at the web site.

35. The method of claim 1, further including the step of automatically sending an e-mail to each member upon closing registration.

36. The method of claim 1, further including the step of providing a roster of the members that will be participating in the meetings.

37. The method of claim 1, further including the step of receiving an override which changes at least one of the meeting schedules.

38. The method of claim 1, further including the step of automatically checking registration data on a registration template prior to the step of generating.

39. The method of claim 1, further including the step of limiting an amount of schedule optimization that each member can submit, responsive to at least one time prior to the event.

40. The method of claim 1, further including the step of calculating a statistic showing byes in the meeting schedules of the respective members.

41. The method of claim 1, further including the step of listing in at least one of the meeting schedules of the respective members a number of byes.

42. The method of claim 1, further including the step of enabling an administrative impersonation of one of the members to login to the computer.

43. The method of claim 1, further including the step of enabling the members to cancel a registration.

44. The method of claim 1, further including the step of receiving payment on line from an event owner computer.

45. The method of claim 1, further including the step of receiving payment on line from one of the members for attending the meeting.

46. The method of claim 1, further including the step of crediting an event organizer against payment for the event.

47. The method of claim 1, further including the step of associating a unique partner URL to allow a partner discount for the event.

48. The method of claim 1, further including the step of enabling mouseover tool tips explaining a member-accessible data input interface.

49. The method of claim 1, further including the step of producing a list of prior billing activity for prior events paid by an event owner.

50. The method of claim 1, further including the step of enabling an administrative list of all the members in the event and other events supported by a web site.

51. The method of claim 1, further including the step of producing a default price for scheduling the meetings.

52. The method of claim 1, further including the step of producing a change overriding a default price for scheduling the meetings.

53. The method of claim 1, further including the step of producing group-specific pricing.

54. The method of claim 1, further including the step of enabling an administrative override to alter a member classification.

55. The method of claim 1, further including the step of:
receiving from event owner input text inserted into a web site page enabling the receiving steps.

56. The method of claim 1, further including the steps of:
receiving from event owner input of a logo inserted into a web site page enabling the receiving steps.

57. The method of claim 1, further including the step of:
predicting an amount of time to calculate the meeting schedules based on an amount of data being processed.

58. The method of claim 1, further including the step of:
requiring a verification e-mail in order to register for a meeting.

59. The method of claim 1, further including the steps of:
forming a first database;
forming a backup of the database; and
enabling use of the back up database to restore the first database, wherein the databases include said data sets.

60. The method of claim 1, further including the step of:
encrypting each password used, respectively corresponding to each said member.

61. The method of claim 1, further including the step of:
organizing an additional event by providing a subdomain to organize corresponding data entry for the events.

62. The method of claim 1, wherein the meetings are virtual meetings by telephone.

63. The method of claim 1, further including the step of:
translating a web site that enables the steps of receiving.

64. The method of claim 1, further including the step of:
inserting photographs of members into a member packet generated by the computer.

65. The method of claim 1, further including the step of:
enabling a web site of an event owner to allow registration and payment for the event without necessitating that the members go to a second web site.

66. The method of claim 1, further including the step of:
generating a report of responses to survey questions presented at registration of the members on a web site.

67. The method of claim 1, further including the step of:
automatically checking to ensure there are no double registrations of any of the members.

68. The method of claim 1, further including the step of:
importing member data from an event owner computer to enable registration of the plurality of the members.

69. The method of claim 1, further including the step of:
providing differentiated access to the computer, the differentiated access including full access to administration, access to at least one of event creation and the event for an event owner, and access to member data for one of said members.

70. The method of claim 1, wherein the step of generating the output includes the steps of:
normalizing the data sets to an average of all the members;
determining a preference score for each of the members;
forming a maximum sum of scores for all the members to determine the schedules.

71. An apparatus programmed to produce meeting schedules corresponding to a trade show or conference event, the apparatus comprising:
a computer programmed to:
receive parameters defining a trade show or conference event for a plurality of members, wherein the parameters comprise a date and time of the event, a length of time for member meetings, and one or more default classifications for members participating in the event;
receive a data set for each of the members, the data set comprising:
at least one classification characterizing the member, wherein the at least one classification characterizing the member is either selected from a list of the one or more default classifications or input by the member,
personal information comprising a name and other information of the member,
at least one classification for meeting other members of the plurality of members, wherein the at least one classification for meeting other members is selected from a list that includes the default classifications and the member-input classifications,
a preference score for each selected classification for meeting the other members, and
an optional indicator of a desire not to meet at least one of: one other member, other members of a particular classification, and both; and
generate, prior to the date and time of the event and using the classifications and the preference scores, output comprising:
an overall meeting schedule comprising a plurality of member meetings for each of the members participating in the event, the overall meeting schedule including each of the plurality of member meetings for each round of member meetings, the overall meeting schedule based on the length of time for member meetings, wherein no two members are scheduled to meet with one another more than once at the event, wherein first members are more likely to be scheduled to meet second members having a classification that received a high preference score from the first member, and wherein no member meetings are scheduled between first members that indicated a desire not to meet second members characterized by said optional indicator, and
for each member participating in the event, an individual meeting schedule comprising each member meeting for said participating member, the time and location of said member meetings, and the other members that said participating member will meet.

72. The apparatus of claim 71, wherein the computer is enabled to:
normalize the data sets to an average of all the members;
determine a preference score for each of the members; and
form a maximum sum of scores for all the members to determine the schedules of the meetings.

73. An apparatus to produce meeting schedules corresponding to a trade show or conference event, the apparatus including:
a computer programmed by means for controlling the computer so as to enable:
receiving into the computer parameters defining a trade show or conference event for a plurality of members, wherein the parameters comprise a date and time of the event, a length of time for member meetings, and one or more default classifications for members participating in the event;
receiving into the computer a data set for each of the members, the data set comprising:
at least one classification characterizing the member, wherein the at least one classification characterizing the member is either selected from a list of the one or more default classifications or input by the member,
personal information comprising a name and other information of the member,
at least one classification for meeting other members of the plurality of members, wherein the at least one classification for meeting other members is selected from a list that includes the default classifications and the member-input classifications,
a preference score for each selected classification for meeting the other members, and
an optional indicator of a desire not to meet at least one of: one other member, other members of a particular classification, and both; and
generating by the computer, prior to the date and time of the event and using the classifications and the preference scores, output comprising:
an overall meeting schedule comprising a plurality of member meetings for each of the members participating in the event, the overall meeting schedule including each of the plurality of member meetings for each round of member meetings, the overall meeting schedule based on the length of time for member meetings, wherein no two members are scheduled to meet with one another more than once at the event, wherein first members are more likely to be scheduled to meet second members having a classification that received a high preference score from the first member, and wherein no member meetings are scheduled between first members that indicated a desire not to meet second members characterized by said optional indicator, and
for each member participating in the event, an individual meeting schedule comprising each member meeting for said participating member, the time and location of said member meetings, and the other members that said participating member will meet.

74. The apparatus of claim 73, wherein the computer and means for controlling cooperate to enable the operations of:
normalizing the data sets to an average of all the members;
determining a preference score for each of the members; and
forming a maximum sum of scores for all the members to determine the schedules of the meetings.

75. A non-transitory computer-readable media tangibly embodying a program of instructions executable by a computer to carry out the steps of:
- receiving into the computer parameters defining a trade show or conference event for a plurality of members, wherein the parameters comprise a date and time of the event, a length of time for member meetings, and one or more default classifications for members participating in the event;
- receiving into the computer a data set for each of the members, the data set comprising:
  - at least one classification characterizing the member, wherein the at least one classification characterizing the member is either selected from a list of the one or more default classifications or input by the member,
  - personal information comprising a name and other information of the member,
  - at least one classification for meeting other members of the plurality of members, wherein the at least one classification for meeting other members is selected from a list that includes the default classifications and the member-input classifications,
  - a preference score for each selected classification for meeting the other members, and
  - an optional indicator of a desire not to meet at least one of: one other member, other members of a particular classification, and both; and
- generating by the computer, prior to the date and time of the event and using the classifications and the preference scores, output comprising:
  - an overall meeting schedule comprising a plurality of member meetings for each of the members participating in the event, the overall meeting schedule including each of the plurality of member meetings for each round of member meetings, the overall meeting schedule based on the length of time for member meetings, wherein no two members are scheduled to meet with one another more than once at the event, wherein first members are more likely to be scheduled to meet second members having a classification that received a high preference score from the first member, and wherein no member meetings are scheduled between first members that indicated a desire not to meet second members characterized by said optional indicator, and
  - for each member participating in the event, an individual meeting schedule comprising each member meeting for said participating member, the time and location of said member meetings, and the other members that said participating member will meet.

76. The media of claim 75, wherein the media is a member of a group including at least one of a ROM, a disk, an ASIC, and a PROM.

77. The media of claim 75, wherein the steps include:
- normalizing the data sets to an average of all the members;
- determining a preference score for each of the members; and
- forming a maximum sum of scores for all the members to determine the schedules of the meetings.

78. An electronic transmission apparatus handling communications to implement part of a trade show or conference event, the apparatus including:
- an electronic transmission computer communicating data over an Internet network to a first computer, the first computer programmed to enable receiving into the first computer parameters defining a trade show or conference event for a plurality of members, wherein the parameters comprise a date and time of the event, a length of time for member meetings, and one or more default classifications for members participating in the event;
- receiving into the first computer a data set for each of the members, the data set comprising:
  - at least one classification characterizing the member, wherein the at least one classification characterizing the member is either selected from a list of the one or more default classifications or input by the member,
  - personal information comprising a name and other information of the member,
  - at least one classification for meeting other members of the plurality of members, wherein the at least one classification for meeting other members is selected from a list that includes the default classifications and the member-input classifications,
  - a preference score for each selected classification for meeting the other members, and
  - an optional indicator of a desire not to meet at least one of: one other member, other members of a particular classification, and both; and
- generating by the first computer, prior to the date and time of the event and using the classifications and the preference scores, output comprising:
  - an overall meeting schedule comprising a plurality of member meetings for each of the members participating in the event, the overall meeting schedule including each of the plurality of member meetings for each round of member meetings, the overall meeting schedule based on the length of time for member meetings, wherein no two members are scheduled to meet with one another more than once at the event, wherein first members are more likely to be scheduled to meet second members having a classification that received a high preference score from the first member, and wherein no member meetings are scheduled between first members that indicated a desire not to meet second members characterized by said optional indicator, and
  - for each member participating in the event, an individual meeting schedule comprising each member meeting for said participating member, the time and location of said member meetings, and the other members that said participating member will meet, and wherein the first computer receives the data and uses the data to facilitate a meeting by at least one of the members participating in the event.

79. The apparatus of claim 78, wherein the data comprises at least one of registration information, information to become a user, and payment information.

80. The apparatus of claim 78, wherein the generating includes:
- normalizing the data sets to an average of all the members;
- determining a preference score for each of the members; and
- forming a maximum sum of scores for all the members to determine the schedule of the meetings.

81. An electronic receiver apparatus handling communications to implement part of a trade show or conference event, the apparatus including:
- an electronic receiver computer receiving data over an Internet network from a first computer programmed to enable
- entering into the first computer parameters defining a trade show or conference event for a plurality of members, wherein the parameters comprise a date and time of the event, a length of time for member meetings, and one or more default classifications for members participating in the event;

entering into the first computer a data set for each of the members, the data set comprising:
- at least one classification characterizing the member, wherein the at least one classification characterizing the member is either selected from a list of the one or more default classifications or input by the member,
- personal information comprising a name and other information of the member,
- at least one classification for meeting other members of the plurality of members, wherein the at least one classification for meeting other members is selected from a list that includes the default classifications and the member-input classifications,
- a preference score for each selected classification for meeting the other members, and
- an optional indicator of a desire not to meet at least one of: one other member, other members of a particular classification, and both; and generating by the first computer, prior to the date and time of the event and using the classifications and the preference scores, output comprising:
- an overall meeting schedule comprising a plurality of member meetings for each of the members participating in the event, the overall meeting schedule including each of the plurality of member meetings for each round of member meetings, the overall meeting schedule based on the length of time for member meetings, wherein no two members are scheduled to meet with one another more than once at the event, wherein first members are more likely to be scheduled to meet second members having a classification that received a high preference score from the first member, and wherein no member meetings are scheduled between first members that indicated a desire not to meet second members characterized by said optional indicator, and
- for each member participating in the event, an individual meeting schedule comprising each member meeting for said participating member, the time and location of said member meetings, and the other members that said participating member will meet, and wherein the data facilitates a meeting by at least one of the members participating in the event.

82. The apparatus of claim 81, wherein the data comprises at least one of registration information, information to become a user, and payment information.

83. The apparatus of claim 81, wherein the generating includes:
- normalizing the data sets to an average of all the members;
- determining a preference score for each of the members; and
- forming a maximum sum of scores for all the members to determine the schedule of the meetings.

84. An apparatus to produce a meeting schedule of meetings corresponding to a trade show or conference event, the apparatus including:

a computer programmed to carry out the operations of:

receiving into the computer parameters defining a trade show or conference event for a plurality of members, wherein the parameters comprise a date and time of the event, a length of time for member meetings, and one or more default classifications for members participating in the event;

receiving into the computer a data set for each of the members, the data set comprising:
- at least one classification characterizing the member, wherein the at least one classification characterizing the member is either selected from a list of the one or more default classifications or input by the member,
- personal information comprising a name and other information of the member,
- at least one classification for meeting other members of the plurality of members, wherein the at least one classification for meeting other members is selected from a list that includes the default classifications and the member-input classifications,
- a preference score for each selected classification for meeting the other members, and
- an optional indicator of a desire not to meet at least one of: one other member, other members of a particular classification, and both;

normalizing, by the computer, the performance scores for all data sets to normalize any difference between preference scores within each data set and, for each pair of the members, using the pair's normalized preference scores for meeting one another to produce a meeting preference score for the pair; and generating by the computer, prior to the date and time of the event and using the classifications and the preference scores, output comprising:
- an overall meeting schedule comprising a plurality of member meetings for each of the members participating in the event, the overall meeting schedule including each of the plurality of member meetings for each round of member meetings, the overall meeting schedule based on the length of time for member meetings, wherein no two members are scheduled to meet with one another more than once at the event, wherein first members are more likely to be scheduled to meet second members having a classification that received a high preference score from the first member, and wherein no member meetings are scheduled between first members that indicated a desire not to meet second members characterized by said optional indicator, and
- for each member participating in the event, an individual meeting schedule comprising each member meeting for said participating member, the time and location of said member meetings, and the other members that said participating member will meet.

* * * * *